United States Patent
Takeda et al.

(10) Patent No.: US 11,418,301 B2
(45) Date of Patent: Aug. 16, 2022

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 34 days.

(21) Appl. No.: 16/597,528

(22) Filed: Oct. 9, 2019

(65) Prior Publication Data

US 2020/0044800 A1    Feb. 6, 2020

Related U.S. Application Data

(63) Continuation of application No. 15/885,494, filed on Jan. 31, 2018, now abandoned, which is a
(Continued)

(30) Foreign Application Priority Data

Jul. 31, 2015    (JP) .................................. 2015-151998

(51) Int. Cl.
*H04L 5/00*    (2006.01)
*H04J 11/00*    (2006.01)
*H04W 72/04*    (2009.01)

(52) U.S. Cl.
CPC ............ *H04L 5/0046* (2013.01); *H04J 11/00* (2013.01); *H04L 5/0007* (2013.01);
(Continued)

(58) Field of Classification Search
CPC ... H04L 5/0046; H04L 5/0007; H04L 5/0016; H04L 5/0053; H04L 5/001; H04L 5/0094;
(Continued)

(56) References Cited

U.S. PATENT DOCUMENTS 8,259,602 B2    9/2012    Kim et al.
9,717,089 B2    7/2017    Chae et al.
(Continued)

FOREIGN PATENT DOCUMENTS

JP    2011-523248        8/2011
JP    2011-523248 A      8/2011
(Continued)

OTHER PUBLICATIONS

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)" Mar. 2010, (149 pages).
(Continued)

*Primary Examiner* — Steven H Nguyen
(74) *Attorney, Agent, or Firm* — Osha Bergman Watanabe & Burton LLP

(57) ABSTRACT

A user terminal is disclosed that includes a transmitter that transmits uplink control information (UCI) using an uplink control channel and a processor that controls at least one of generation and transmission of the UCI based on a spreading factor of the uplink control channel. Additionally, at least one of a number of symbols and a position of a demodulation reference signal for the uplink control channel is fixed irrespective of the spreading factor.

11 Claims, 17 Drawing Sheets

| SF | PAYLOAD | MAXIMUM NUMBER OF UCI BITs |
|----|---------|---------------------------|
| 1  | 288     | 64                        |
| 2  | 144     | 28                        |
| 3  | 96      | 16                        |

Related U.S. Application Data continuation of application No. PCT/JP2016/072048, filed on Jul. 27, 2016.

(52) U.S. Cl.
CPC .......... *H04L 5/0016* (2013.01); *H04L 5/0053* (2013.01); *H04J 2011/0009* (2013.01); *H04J 2211/006* (2013.01); *H04L 5/001* (2013.01); *H04L 5/0094* (2013.01); *H04W 72/0413* (2013.01); *H04W 72/0446* (2013.01)

(58) Field of Classification Search
CPC ............... H04J 11/00; H04J 2011/0009; H04J 2211/006; H04W 72/0413; H04W 72/0446
See application file for complete search history.

(56) References Cited

U.S. PATENT DOCUMENTS

| | | | |
|---|---|---|---|
| 2010/0271970 A1* | 10/2010 | Pan | H04L 1/0029 370/252 |
| 2011/0243066 A1* | 10/2011 | Nayeb Nazar | H04L 1/007 370/328 |
| 2012/0039275 A1 | 2/2012 | Chen et al. | |
| 2012/0320859 A1* | 12/2012 | Ahn | H04L 1/1861 370/329 |
| 2013/0039334 A1* | 2/2013 | Han | H04L 5/0007 370/330 |
| 2014/0105076 A1* | 4/2014 | Yang | H04J 3/1694 370/280 |
| 2015/0036607 A1 | 2/2015 | Park et al. | |
| 2016/0226644 A1* | 8/2016 | Gaal | H04W 72/0413 |
| 2016/0338041 A1 | 11/2016 | Li et al. | |
| 2016/0359663 A1 | 12/2016 | Song et al. | |
| 2017/0006491 A1 | 1/2017 | Chen et al. | |
| 2017/0171866 A1 | 6/2017 | Cheng | |
| 2017/0215201 A1* | 7/2017 | Kim | H04L 1/1812 |
| 2018/0027550 A1 | 1/2018 | Berggren | |
| 2018/0145796 A1 | 5/2018 | Liang et al. | |
| 2018/0262295 A1* | 9/2018 | Oketani | H04L 27/2602 |
| 2018/0302209 A1 | 10/2018 | Malladi et al. | |

FOREIGN PATENT DOCUMENTS

| | | |
|---|---|---|
| WO | 2014-084566 | 6/2014 |
| WO | 2014/084566 A1 | 6/2014 |

OTHER PUBLICATIONS

Alcatel-Lucent et al., "PUCCH design for A/N feedbacks on PCell up to 32 carrier aggregation", 3GPP TSG-RAN WG1 Meeting #81, R1-152666, Fukuoka, Japan, May 25-29, 2015 (5 pages).

CATR; "Consideration on enhancement to UL control signalling for up to 32 component carriers"; 3GPP TSG RAN WG1 Meeting #81 R1-153268; Fukuoka, Japan, May 25-29, 2015 (3 pages).

CATT; "New PUCCH format(s) for up to 32 CCs"; 3GPP TSG RAN WG1 Meeting #80bis, R1-151348; Belgrade, Serbia, Apr. 20-24, 2015 (4 Pages).

Extended European Search Report issued in the counterpart European Patent Application No. 16832872.2, dated May 23, 2018 (9 pages).

Extended European Search Report issued in the counterpart European Patent Application No. 18210986.8, dated Feb. 5, 2019 (8 pages).

Huawei et al.; "New PUCCH format design to support UCI transmission for up to 32 component carriers"; 3GPP TSG RAN WG1 Meeting #81 R1-152462; Fukuoka, Japan, May 25-29, 2015 (9 pages).

Huawei et al.; "PUCCH resource allocation"; 3GPP TSG RAN WG1 Meeting 81 R1-153196; Fukuoka, Japan, May 25-29, 2015 (5 pages).

Intel Corporation; "HARQ-ACK feedback for CA with up to 32 CCs"; 3GPP TSG-RAN WG1 #81, R1-152625; Fukuoka, Japan, May 25-29, 2015 (4 Pages).

International Search Report for corresponding International Application No. PCT/JP2016/072048, dated Aug. 30, 2016 (2 pages).

LG Electronics, "HARQ-ACK PUCCH transmission for Rel-13 CA", 3GPP TSG RAN WG1 Meeting #80bis, R1-151502, Belgrade, Serbia, Apr. 20-24, 2015 (6 pages).

Nokia Networks, "Performance analysis of new PUCCH format designs", 3GPP TSG-RAN WG1 Meeting #81, R1-152808, Fukuoka, Japan, May 25-29, 2015 (8 pages).

Office Action issued in corresponding Japanese Patent Application No. 2015-151998, dated Aug. 23, 2016 (6 pages).

Office Action issued in corresponding Japanese Patent Application No. 2015-151998, dated Dec. 13, 2016 (11 pages).

Office Action issued in the counterpart Japanese Patent Application No. 2017-066518, dated May 1, 2018 (6 Pages).

Written Opinion for corresponding International Application No. PCT/JP2016/072048, dated Aug. 30, 2016 (4 pages).

Office Action issued in European Application No. 18210986.8, dated May 26, 2020 (6 pages).

Office Action issued in the counterpart Chinese Patent Application No. 201680044964.3, dated Aug. 31, 2021 (16 pages).

\* cited by examiner

| SF | PAYLOAD | MAXIMUM NUMBER OF UCI BITs |
|---|---|---|
| 1 | 288 | 64 |
| 2 | 144 | 28 |
| 3 | 96 | 16 |

FIG. 7

| NUMBER OF PRBs | SF | PAYLOAD | MAXIMUM NUMBER OF UCI BITS |
|---|---|---|---|
| 1 | 1 | 288 | 64 |
| 2 | 1 | 576 | 112 |
| 3 | 1 | 864 | 172 |

FIG. 11

USER TERMINAL AND RADIO COMMUNICATION METHOD

CROSS-REFERENCE TO RELATED APPLICATIONS

This application is a continuation application of U.S. application Ser. No. 15/885,494, filed on Jan. 31, 2018, which is a national phase application of PCT/JP2016/072048, filed on Jul. 27, 2016, which claims priority to Japanese Patent Application No. 2015-151998, filed on Jul. 31, 2015. The contents of these applications are hereby incorporated by reference in their entirety.

TECHNICAL FIELD

One or more embodiments disclosed herein relate to a user terminal, a radio base station and a radio communication method in next-generation mobile communication systems.

BACKGROUND

In the UMTS (Universal Mobile Telecommunication System) network, the specifications of long term evolution (LTE) have been drafted for the purpose of further increasing high speed data rates, providing lower delays and so on (see non-patent literature 1). LTE Advanced (also referred to as LTE Rel. 10, 11 or 12) is specified for the purpose of further broadbandization and speed-up from LTE (also referred to as LTE Rel. 8), and a successor system (also referred to as LTE Rel. 13 or the like) is also under study.

The system band in LTE Rel. 10/11 includes at least one component carrier (CC), where the LTE system band of LTE Rel. 8 constitutes one unit. Such bundling of a plurality of CCs into a wide band is referred to as "carrier aggregation" (CA).

In LTE of Rel. 8 to 12, the specifications have been drafted assuming exclusive operations in frequency bands that are licensed to operators—that is, licensed bands. For licensed bands, for example, 800 MHz, 2 GHz and/or 1.7 GHz have been in use.

In LTE of Rel. 13 and later versions, operation in frequency bands where license is not required—that is, unlicensed bands—is also a target of study. For unlicensed band, for example, 2.4 GHz, which is the same as in Wi-Fi, or the 5 GHz band and/or the like, may be used. Although carrier aggregation (LAA: license-assisted access) between licensed bands and unlicensed bands is placed under study in Rel. 13 LTE, there is a possibility that, in the future, dual connectivity and unlicensed-band stand-alone will becomes targets of study as well.

CITATION LIST

Non-Patent Literature

Non-Patent Literature 1: 3GPP TS 36.300 Rel.8 "Evolved Universal Terrestrial Radio Access (E-UTRA) and Evolved Universal Terrestrial Radio Access Network (E-UTRAN); Overall description; Stage 2"

SUMMARY

Embodiments disclosed herein include a user terminal configured to communicate with a radio base station, comprising: a processor that configures a number of resource blocks used in a format for an uplink control signal; and a transmitter that transmits to the radio base station the uplink control signal using the format comprising the configured number of resource blocks.

In one aspect, the processor configures as the number of resource blocks a number of resource blocks designated based on higher layer signaling.

In one aspect, the processor maps uplink control information (UCI) in order from a first Single Carrier Frequency Division Multiple Access (SC-FDMA) symbol in the configured number of resource blocks.

In one aspect, a spreading factor of the format is smaller than that of PUCCH format 3.

In one aspect, UCI is modulated by Quadrature Phase Shift Keying (QPSK) in the format.

In one aspect, the processor performs rate matching of UCI so as to coincide with a number of bits determined based on the configured number of resource blocks.

Embodiments disclosed herein further include a radio base station configured to communicate with a user terminal, comprising: a processor that configures a number of resource blocks used in a format for an uplink control signal; and a receiving section that receives from the user terminal the uplink control signal using a format comprising the configured number of resource blocks.

Embodiments disclosed herein further include a radio communication method in a user terminal configured to communicate with a radio base station, the radio communication method comprising: configuring a number of resource blocks used in a format for an uplink control signal; and transmitting to the radio base station the uplink control signal using the format comprising the configured number of resource blocks.

BRIEF DESCRIPTION OF DRAWINGS

FIG. 7 is a diagram showing the relationship between spreading factor and payload according to the first example;

FIG. 11 is a diagram showing the relationship between the number of PRBs and the payload according to the second example;

DETAILED DESCRIPTION

In the carrier aggregation of LTE Rel. 10-12, the number of component carriers that can be configured per user terminal is limited to maximum five. In CA in and after LTE Rel. 13, a study is in progress to expand the number of CCs that can be configured per user terminal to six or more in order to realize further band expansion.

By the way, in existing systems, uplink control information (UCI) including delivery acknowledgment information (HARQ-ACK: Hybrid Automatic Repeat reQuest ACKnowledgment) and the like for downlink signals of each CC is transmitted using an uplink control signal (PUCCH: Physical Uplink Control Channel) or an uplink data signal (PUSCH: Physical Uplink Shared Channel).

When the uplink control signal (PUCCH) is used, the user terminal transmits UCI including delivery acknowledgment information and the like for downlink signals of each CC, using existing formats that presumes 5 or fewer CCs (for example, PUCCH formats 1a/1b/3, etc.). However, when UCI including delivery acknowledgment information of a large number of CCs is transmitted as in the case where the number of CCs is expanded to six or more, it is expected that existing formats will not be suitable. Therefore, a new format for uplink control signals (PUCCH) that is suitable even when the number of CCs is expanded to six or more is desired.

In view of the above points, one or more embodiments of the present invention provide a user terminal, a radio base station and a radio communication method that can transmit uplink control signals using a suitable format even when the number of component carriers (CCs) that can be configured per user terminal is expanded more than in existing systems.

According to one aspect of the present invention, a user terminal configured to communicate with a radio base station comprises a processor that configures a number of resource blocks used in a format for an uplink control signal; and a transmitter that transmits to the radio base station the uplink control signal using the format comprising the configured number of resource blocks.

According to one or more embodiments of the present invention, it is possible to transmit uplink control signals using a suitable format even when the number of component carriers (CCs) that can be configured per user terminal is expanded more than in existing systems.

Figure 1:
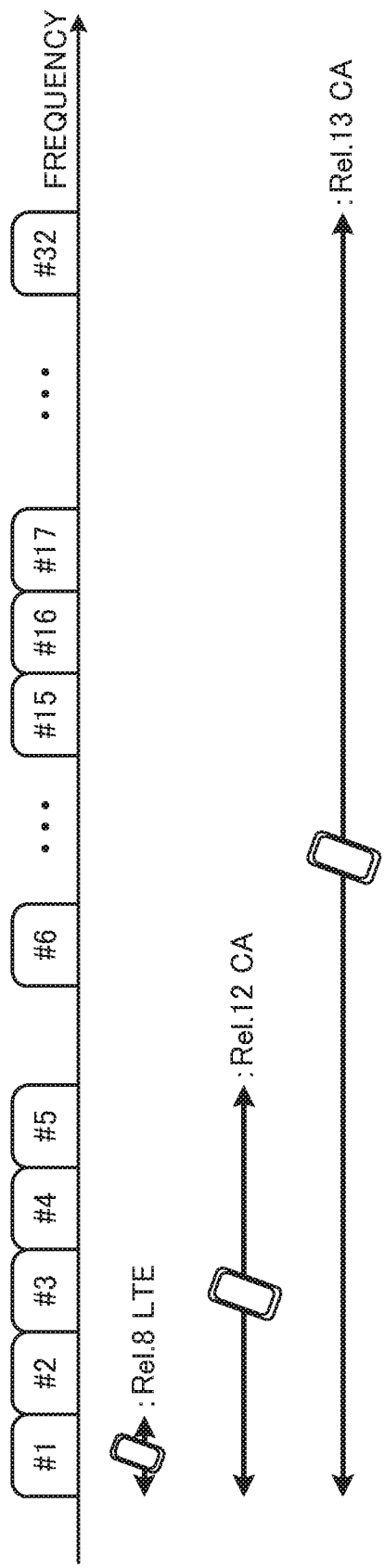
FIG. 1 is a diagram to explain carrier aggregation.

FIG. 1 is a diagram to explain carrier aggregation (CA). As shown in FIG. 1, in CA of up to LTE Rel. 12, maximum five component carriers (CCs) (CC #1 to CC #5) are bundled, where the system band of LTE Rel. 8 constitutes one unit. That is, in carrier aggregation up to LTE Rel. 12, the number of CCs that can be configured in a user terminal (UE: User Equipment) is limited to maximum five.

Meanwhile, in carrier aggregation of LTE Rel. 13, a study is in progress to further expand the band by bundling six or more CCs. That is, in CA of LTE Rel. 13, expansion of the number of CCs (cells) that can be configured per user terminal to six or more (CA enhancement) is being studied. For example, as shown in FIG. 1, when 32 CCs (CC #1 to CC #32) are bundled, a bandwidth of maximum 640 MHz can be secured.

In this way, more flexible and faster radio communication is expected to be made possible by increasing the number of CCs that can be configured in a user terminal. Also, expanding the number of CCs like this is an effective way to widen the band based on CA (LAA: License-Assisted Access) between licensed bands and unlicensed bands. For example, five licensed band CCs (=100 MHz) and fifteen unlicensed band CCs (=300 MHz) are bundled, and a bandwidth of 400 MHz can be secured.

Meanwhile, when the number of CCs that can be configured in a user terminal is expanded to six or more (for example, 32), it is difficult to directly apply the transmission methods used in existing systems (Rel. 10 to 12) (for example, PUCCH formats) on an as-is basis.

For example, in the existing system (LTE Rel. 10-12), the user terminal transmits the uplink control information (UCI) by using the uplink control channel (PUCCH). Here, the UCI includes at least one of delivery acknowledgment information (HARQ-ACK) for the downlink shared channel (PDSCH: Physical Downlink Shared Channel) of each CC, channel state information (CSI) indicating the channel state and an uplink shared channel (PUSCH) scheduling request (SR: Scheduling Request).

In existing systems, PUCCH formats 1/1a/1b, 2/2a/2b, and 3 (collectively referred to as "existing PUCCH formats") are supported as PUCCH formats (hereinafter referred to as "PUCCH formats"). PUCCH format 1 is used to transmit SR. PUCCH formats 1a/1b/1b with channel selection and 3 are used to transmit HARQ-ACKs for five or fewer CCs. PUCCH formats 2/2a/2b are used to transmit CSI for a specific CC. PUCCH formats 2a/2b may be used to transmit HARQ-ACKs in addition to CSI for a particular CC. PUCCH format 3 may be used to transmit SR and/or CSI in addition to HARQ-ACKs.

Figure 2:
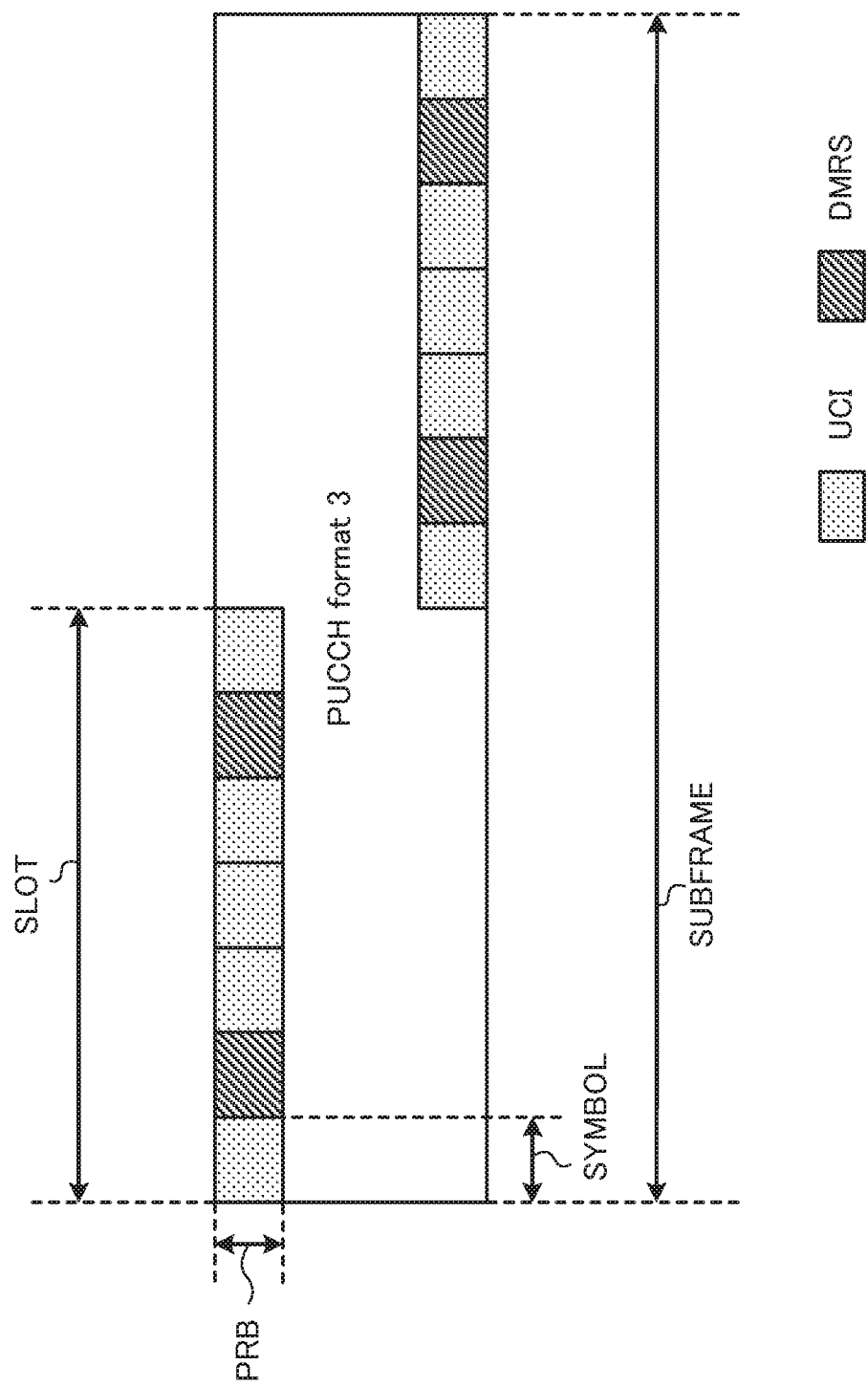
FIG. 2 shows the configuration of existing PUCCH format 3.

FIG. 2 is a diagram showing an example of the configuration of PUCCH format 3, having the maximum payload among existing PUCCH formats. With PUCCH format 3, it is possible to transmit UCI up to 10 bits in FDD and up to 22 bits in TDD (HARQ-ACKs for up to 5 CCs, for example). As shown in FIG. 2, PUCCH format 3 is composed of two demodulation reference signal (DMRS: DeModulation Reference Signal) symbols and five SC-FDMA (Single Carrier Frequency Divisional Multiple Access) symbols per slot. The same bit sequence is mapped to the SC-FDMA symbols in a slot, and these SC-FDMA symbols are multiplied by spreading codes (orthogonal codes, also referred to as "OCC: Orthogonal Cover Codes") so that a plurality of user terminals can be multiplexed.

Also, cyclic shifts (hereinafter also referred to as "CSs") that vary between user terminals are applied to the DMRSs in each slot. By applying orthogonal codes and cyclic shifts, it is possible to code-division-multiplex (CDM) up to five PUCCH formats 3 on the same resource (PRB). For example, it is possible to orthogonal-multiplex HARQ bit sequences using different OCC sequences per user terminal, and orthogonal-multiplex DMRSs by using different CS sequences per user.

However, when the number of CCs that can be configured per user terminal is expanded to six or more (for example, 32), PUCCH format 3 may not be able to provide sufficient payload, and it may not be possible to transmit UCI with respect to all the scheduled CCs.

For example, in FDD, when transmitting HARQ-ACKs of two codewords (transport blocks) for 32 CCs, a PUCCH format capable of transmitting 64 bits is necessary. Further, in TDD, when HARQ-ACKs of two codewords are transmitted for 32 CCs and four uplink subframes correspond to one uplink subframe, a PUCCH format capable of transmitting 128 bits (when spatial bundling is applied) or 256 bits is required.

Therefore, in order to make it possible to transmit UCI (for example, HARQ-ACKs) for six or more CCs, a study is in progress to introduce a PUCCH that can transmit a larger number of bits (payload and capacity) than existing PUCCH formats (hereinafter referred to as "new PUCCH format"). Note that a new PUCCH format may be referred to as "PUCCH format 4," "large capacity PUCCH format," "enhanced PUCCH format," "new format," and the like.

Configuration examples of new PUCCH formats will be described with reference to FIGS. 3A, 3B, 4A, 4B, 5A, and 5B. FIGS. 3A, 3B, 4A, 4B, 5A, and 5B are merely examples, and the positions and number of DMRSs, the number of PRBs, the method of multiplexing a plurality of user terminals, and the like are not limited to those shown in FIGS. 3A, 3B, 4A, 4B, 5A, and 5B. Further, a reference signal (not shown) may be arranged (for example, a sounding reference signal (SRS)). Also, at least two of the configuration examples described with reference to FIGS. 3A, 3B, 4A, 4B, 5A, and 5B may be used in combination.

Figure 3A:
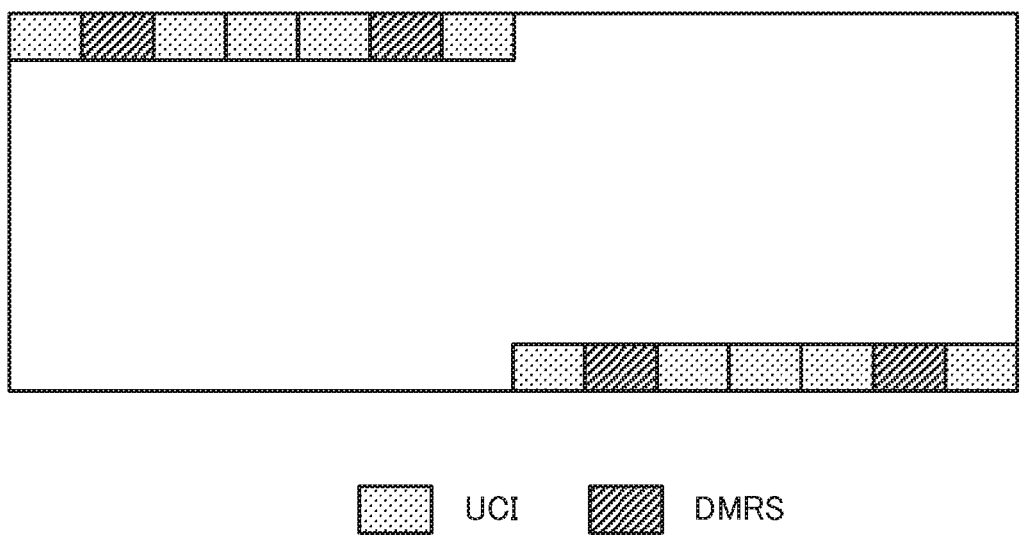
FIGS. 3A and 3B are diagrams showing a first configuration example of a new PUCCH format.
Figure 3B:
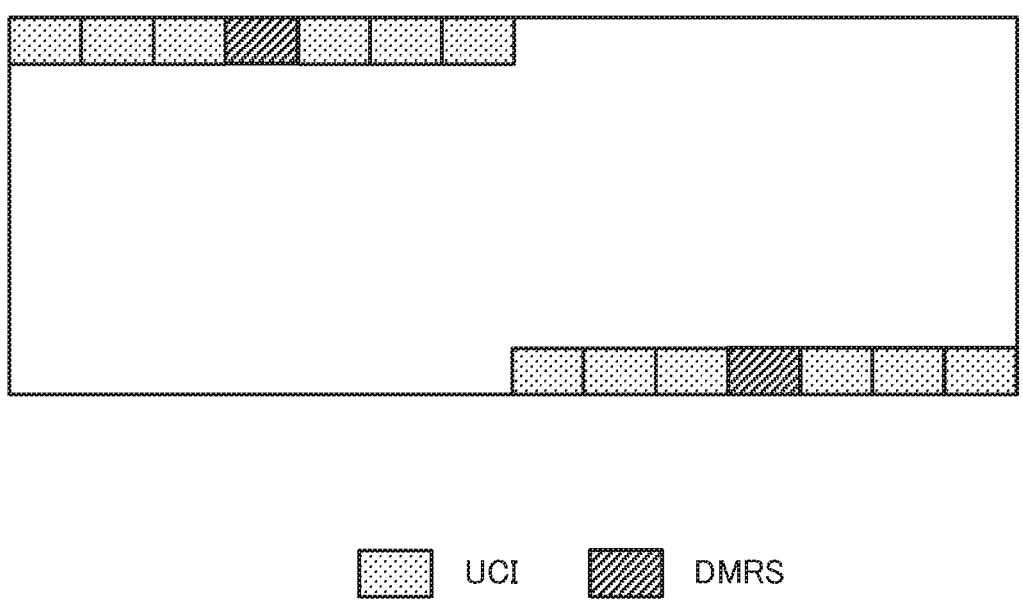

FIGS. 3A and 3B are diagrams showing a first configuration example of a new PUCCH format. As shown in FIGS. 3A and 3B, the positions and the number of DMRSs arranged in a new PUCCH format may be the same as or different from those of PUCCH format 3. By increasing the number of DMRSs to arrange in a new PUCCH format, channel estimation can be performed with high accuracy even in an environment with low SINR or in a high-speed moving environment. On the other hand, if the number of DMRSs is reduced, the payload (the number of bits that can be transmitted) can be increased, so that higher coding gain can be obtained.

For example, as shown in FIG. 3A, in a new PUCCH format, DMRSs may be allocated to the second and sixth SC-FDMA symbols (time symbols) in each slot as in the case of PUCCH format 3 (see FIG. 2). By increasing the number of DMRS symbols in each slot, the accuracy of channel estimation, it is possible to reduce the influence of high-speed moving environment and frequency offset. Alternatively, as shown in FIG. 3B, in a new PUCCH format, a DMRS may be placed in the fourth SC-FDM symbol of each slot. By increasing the number of non-DMRS symbols in each slot, the coding rate can be reduced, so that it is possible to improve the reception quality even in an environment with a low signal-to-interference noise power ratio (SINR).

Figure 4A:
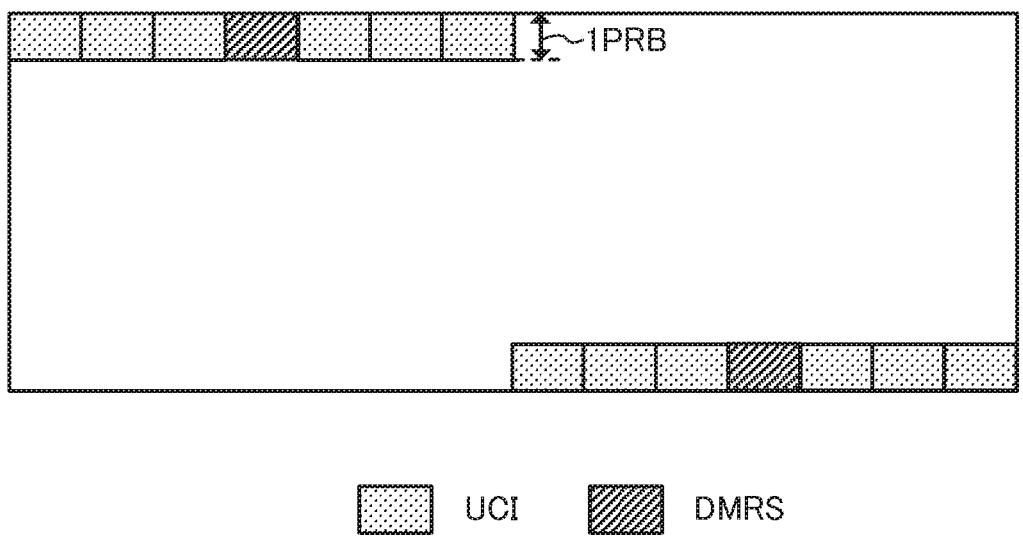
FIGS. 4A and 4B are diagrams showing a second configuration example of a new PUCCH format.
Figure 4B:
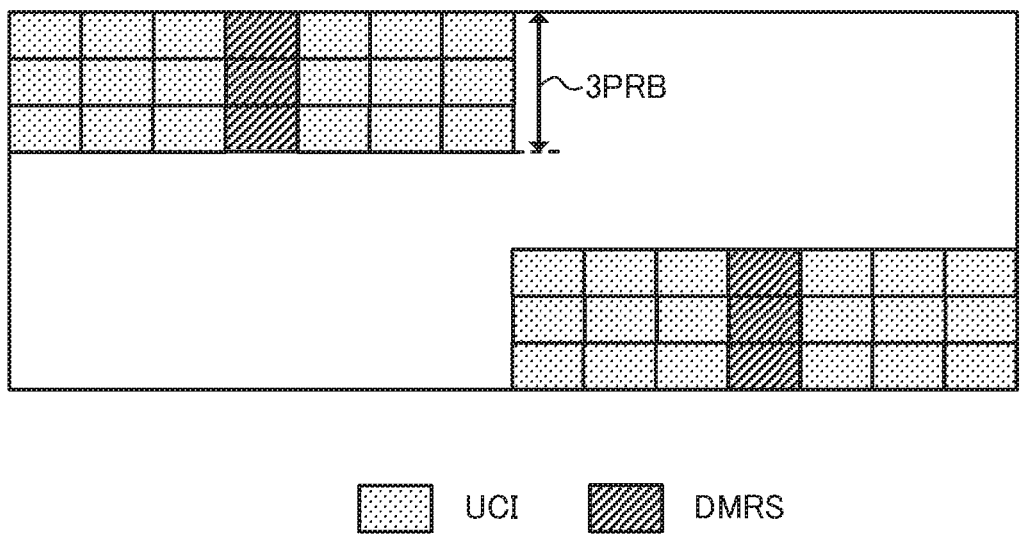

FIGS. 4A and 4B are diagrams showing a second configuration example of a new PUCCH format (the number of PRBs). Also, the frequency resources (also referred to as "physical resource blocks" (PRBs), "resource blocks," etc., and hereinafter referred to as "PRBs") to use for a new PUCCH format may be the same as in PUCCH format 3, or may be larger than in PUCCH format 3. Increasing the number of PRBs to use in a new PUCCH format reduces the payload per PRB, so that, although the coding gain can be increased, the overhead increases.

For example, as shown in FIG. 4A, when using a new PUCCH format, one PRB may be used per slot, as in the case of using PUCCH format 3 (see FIG. 2), or frequency hopping may be applied between slots. Alternatively, as shown in FIG. 4B, when using a new PUCCH format, multiple PRBs may be used per slot (three PRBs in FIG. 4), and frequency hopping may be applied between slots. When the number of PRBs is small, the overhead of the PUCCH in the uplink system band can be reduced, and, furthermore, since the transmission power can be concentrated in a small band, a larger coverage can be realized. When the number of PRBs is large, the amount of radio resources increases with respect to the amount of information to be transmitted, so that it is possible to reduce the coding rate and to improve the reception quality even in an environment with a low SINR.

Figure 5A:
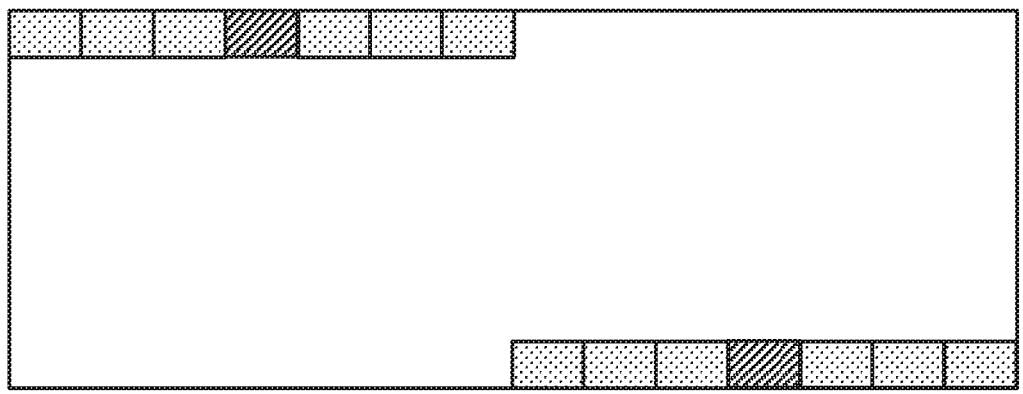
FIGS. 5A and 5B are diagrams showing a third configuration example of a new PUCCH format.
Figure 5B:
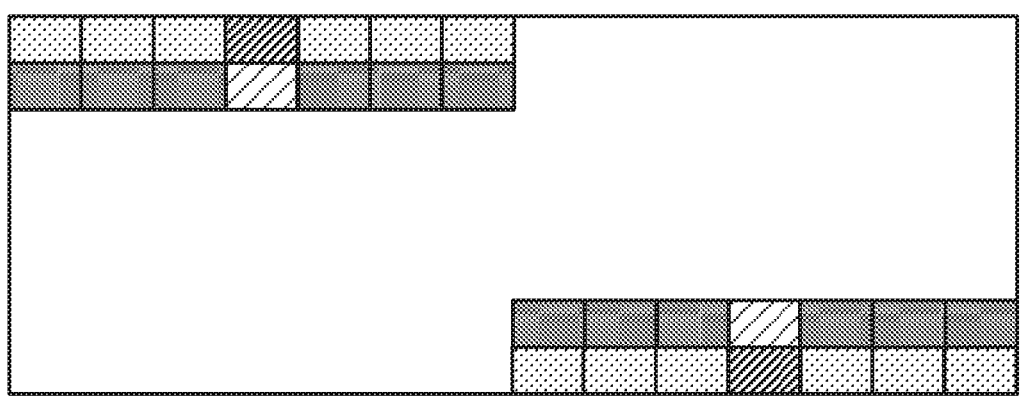

FIGS. 5A and 5B are diagrams showing a third configuration example of a new PUCCH format. As show in FIGS. 5A and 5B, in a new PUCCH format, a plurality of user terminals may be code-division-multiplexed (CDM), frequency-division-multiplexed (FDM) and/or time-division-multiplexed (TDM). When code division multiplexing is used, although multiple user terminals can be accommodated in the same PRB, the payload per user terminal becomes smaller, which makes it difficult to obtain coding gain.

For example, as shown in FIG. 5A, in a new PUCCH format, a plurality of user terminals may be frequency-division-multiplexed. To be more specific, as in the case of using PUCCH format 3 (see FIG. 2), it is possible to orthogonally-multiplex UCIs of a plurality of user terminals using different spreading codes (OCC) for each user terminal, and it is possible to orthogonally-multiplex the DMRSs of a plurality of user terminals by applying different cyclic shifts for each user terminal. When a new PUCCH format is designed on the premise that CDM is applied, although the PUCCH payload per user terminal is restricted depending on the multiplexing capacity of CDM, the overhead when many user terminals transmit the new PUCCH format at the same time can be suppressed accordingly.

Alternatively, as shown in FIG. 5B, in a new PUCCH format, a plurality of user terminals may be frequency-division-multiplexed. To be more specific, UCIs and DMRSs of a plurality of user terminals may be mapped to different PRBs. When a new PUCCH format is designed on the premise of applying FDM (on the premise that CDM is not applied), the PUCCH payload per user can be increased, so that it is possible to lower the coding rate per user terminal and to improve the reception quality even in an environment with a low SINR.

As described above, the optimal configuration of a new PUCCH format may change depending on the conditions of the radio communication system (for example, the number of user terminals accommodated in the radio base station, coverage, mobility characteristics, scenario, operation mode, etc.). For example, when trying to accommodate multiple user terminals in a radio base station, it is desirable to reduce the overhead by code-division-multiplexing multiple user terminals (see FIG. 5A). On the other hand, when attempting to broaden the coverage, it is desirable to frequency-division-multiplex multiple user terminals with multiple PRBs (see FIG. 5B). Also, when trying to improve the mobility characteristics, it is desirable to have multiple DMRSs (see FIG. 3A). Also, when trying to increase the payload, it is desirable to lower the spreading factor or increase the number of PRBs (see FIG. 4B).

Thus, the optimal configuration of a new PUCCH format is expected to vary depending on the state of the radio communication system. Therefore, the present inventors came up with the idea of using a format (unified format) in which configurations such as the spreading factor (SF) and the number of PRBs are configurable parameters, as a new PUCCH format, leading to one or more embodiments of the present invention. By using a unified format, a new PUCCH format can be optimally configured according to the state of the radio communication system.

Now, embodiments of the present invention will be described in detail. In the embodiments, the user terminal can control the configurations of new PUCCH formats in a configurable manner. In the following description, cases will be described in which the user terminal configures at least one of the spreading factor (first example) used in the new PUCCH format and the number of PRBs (the number of resource blocks) (second example) constituting the new PUCCH format. However, the configuration of the new PUCCH format that is configured as a parameter is not limited to the number of spreading factors and PRBs, and other configurations may be configured as parameters (for example, the number of DM-RSs, etc.).

First Example

In a first example, a radio communication method using a new PUCCH format in which the spreading factor (SF) is configurable is described. Note that the spreading factor may be referred to as an orthogonal code length or the like.

Figure 6A:
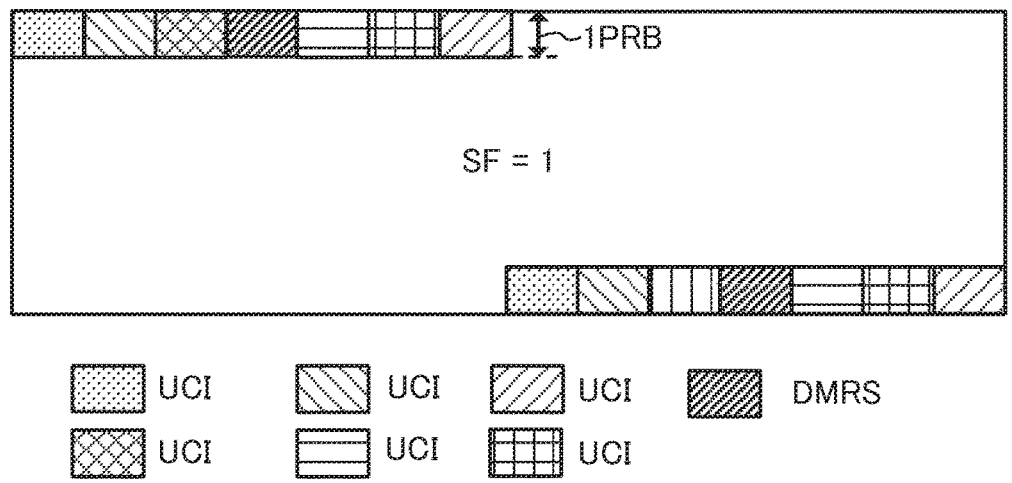
FIGS. 6A, 6B and 6C are diagrams showing a configuration example of a new PUCCH format according to the first example.
Figure 6B:
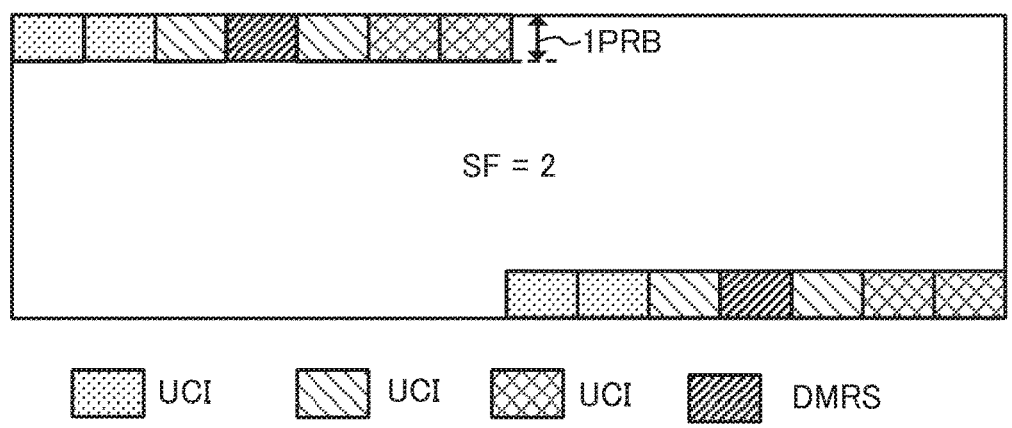
Figure 6C:
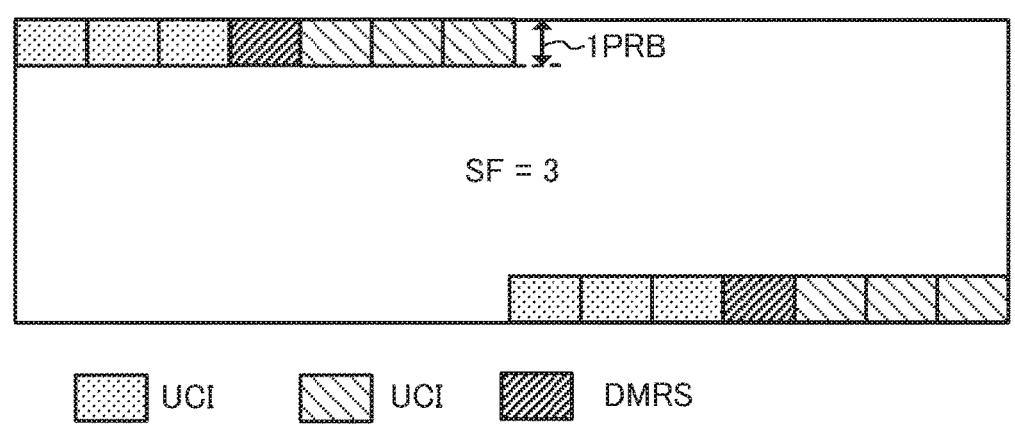

FIGS. 6A, 6B, and 6C are explanatory diagrams of an example of a new PUCCH format in which the spreading factor is configurable. In FIGS. 6A, 6B, and 6C, an example of providing one DMRS symbol per slot will be described, but the number and position of DMRS are not limited to those shown in FIGS. 6A, 6B, and 6C. Further, in FIGS. 6A, 6B, and 6C, SRS may be placed in the final symbol of the new PUCCH format. Also, in FIGS. 6A, 6B, and 6C, an example in which the number of PRBs is 1 will be described, but the number of PRBs may be two or more.

As shown in FIG. 6A, when the spreading factor is 1, 12 types of coded bit sequences (six types of coded bit sequences are mapped per slot) are mapped in the new PUCCH format. Further, as shown in FIG. 6B, when the spreading factor is 2, six types of coded bit sequences (three types of coded bit sequences are mapped per slot) are mapped. Further, as shown in FIG. 6C, when the spreading factor is 3, four types of coded bit sequences (two types of coded bit sequences are mapped per slot) are mapped.

In FIGS. 6A to 6C, the UCI having the same hatching pattern in the first half slot and the latter half slot may not be the same UCI. That is, the UCI transmitted in the first half slot and the latter half slot may be the same bit sequence or may be different bit sequences. Hereinafter, a case where different bit sequences are accommodated in the first half slot and the second half slot will be described as an example.

FIG. 7 is a diagram showing the relationship between the spreading factor to use in the new PUCCH format, the payload of the new PUCCH format (the number of bits of the coded bit sequence that can be accommodated), and the maximum number of UCI bits that can be accommodated in the new PUCCH format (hereinafter referred to as "maximum number of UCI bits"). In FIG. 7, it is assumed that one DMRS is allocated per slot (that is, it is assumed that coded bit sequences can be arranged in six symbols per slot), but this is not limiting. In addition, in FIG. 7, it is assumed that the coding rate is 12/48 and eight CRC bits are added, but the present invention is not limited thereto.

As described above, when the spreading factor is 1, 12 types of coded bit sequences are mapped in the new PUCCH format. In this case, the new PUCCH format can accommodate a coded bit sequence of 12 symbols×12 types (six types per slot)×2 (Quadrature Phase Shift Keying (QPSK))= 288 bits. Also, the number of user terminals that can be code-division-multiplexed (CDM) is 1. Also, when the coding rate is 12/48 and eight CRC bits are added, the maximum number of UCI bits is 64 bits.

In addition, when the spreading factor is 2, as shown in FIG. 6B, six types of coded bit sequences are mapped in the new PUCCH format. In this case, the new PUCCH format can accommodate a code bit sequence of 12 symbols×six types (3 types per slot)×2 (QPSK)=144 bits. Also, the number of user terminals that can be code-division-multi-plexed (CDM) is two. Also, when the coding rate is 12/48 and eight CRC bits are added, the maximum number of UCI bits is 28 bits.

In addition, when the spreading factor is 3, as shown in FIG. 6C, four types of coded bit sequences are mapped in the new PUCCH format. In this case, the new PUCCH format can accommodate a code bit sequence of 12 symbols×4 types (two types per slot)×2 (QPSK)=96 bits. Also, the number of user terminals that can be code-division-multi-plexed (CDM) is three. Also, when the coding rate is 12/48 and eight CRC bits are added, the maximum number of UCI bits is 16 bits.

As described above, when the spreading factor of a new PUCCH format is decreased, the payload is increased, and, on the other hand, fewer user terminals can be code-division-multiplexed. Therefore, the radio base station designates the spreading factor depending on conditions (for example, the number of accommodated user terminals, the number of UCI bits, etc.) and transmits information indicating the spreading factor to the user terminal. When CA using a new PUCCH format is configured (that is, when CA in which six or more CCs can be configured is used), the user terminal configures the spreading factor specified via higher layer signaling or physical layer signaling from the radio base station as the spreading factor of the new PUCCH format.

Note that higher layer signaling is, for example, RRC (Radio Resource Control) signaling. Also, physical layer signaling refers to, for example, information included in downlink control information (DCI) transmitted by a downlink control channel (PDCCH (Physical Downlink Control Channel) or EPDCCH (Enhanced Physical Downlink Control Channel)).

Alternatively, when CA using a new PUCCH format is configured (that is, when CA in which six or more CCs can be configured is used), the user terminal may configure the spreading factor by determining (selecting) the spreading factor to use in the new PUCCH format based on the number of UCI bits. For example, the user terminal may determine the spreading factor of the new PUCCH format based on the number of UCI bits transmitted on the PUCCH and the maximum number of UCI bits according to the spreading factor (see FIG. 7).

<Signal Generation Processing>

Figure 8:
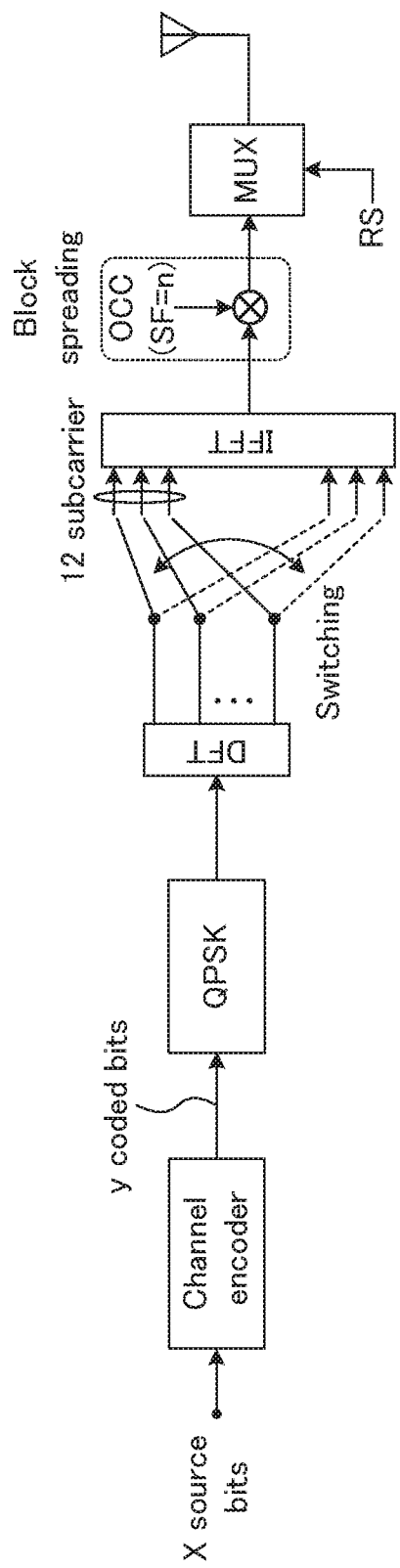
FIG. 8 is a diagram showing an example of signal generation according to the first example.

Signal generation processing in the new PUCCH format in which the spreading factor is configured as described above will be described. FIG. 8 is a diagram showing an example of signal generation processing in the new PUCCH format. Although FIG. 8 shows a case in which data symbol modulation is performed using QPSK (Quadrature Phase Shift Keying), the modulation scheme is not limited to QPSK. Further, although FIG. 8 assumes a case where the new PUCCH format is configured with one PRB (12 subcarriers), the new PUCCH format may be composed of two or more PRBs.

As shown in FIG. 8, the user terminal adds a CRC as necessary to the UCI and inputs an x bit UCI to the channel encoder. As described above, the UCI includes at least one of delivery acknowledgment information (HARQ-ACK), scheduling request (SR) and channel state information (CSI). In the UCI bit sequence, HARQ-ACK, SR and CSI are arranged in this order of priority. For example, when an HARQ-ACK is composed of more than a predetermined number of bits, the user terminal may add a CRC to the UCI including the HARQ-ACK.

In the channel encoder, the user terminal performs encoding and rate matching of x bits of UCI. To be more specific, the user terminal encodes x-bit UCI at a predetermined coding rate (for example, 12/48). If the number of bits that are coded (hereinafter referred to as "the number of coded bits") exceeds the payload of the spreading factor configured in the new PUCCH format, the user terminal punctures at least some of the coded bits. On the other hand, if the number of coded bits is less than the payload, the user terminal repeats at least a part of the coded bit sequences until the number of coded bits matches the payload (repetition). Note that the above encoding procedure may be separately performed for each type of UCI (HARQ-ACK, SR and CQI), or may be performed at once, considering all UCI bit sequences are one bit sequence.

For example, if the spreading factor of the new PUCCH format is configured to 3, the user terminal punctures a portion of the coded bit sequences (for example, excess bits) if the number of coded bits exceeds 96 bits (see FIG. 7). On the other hand, if the number of coded bits is less than 96 bits, the user terminal repeats the coded bit sequence until the number of coded bits becomes 96 bits.

The user terminal maps a y-bit coded bit sequence obtained from the channel encoder to the modulation symbol (SC-FDMA symbol) (data symbol modulation). For example, in the case of QPSK, the user terminal performs discrete Fourier transform (DFT) of y/2 modulation symbols. The user terminal converts the time domain modulation symbol into a frequency domain signal by DFT.

In the user terminal, each frequency domain signal is input to a predetermined subcarrier position in a fast inverse Fourier transform (IFFT) with a predetermined frequency bandwidth (for example, one CC) and converted into a time domain symbol. When inter-slot frequency hopping is performed as shown in FIG. 6, the predetermined subcarrier position is switched between slots as shown in FIG. 8.

The user terminal performs block spreading every 12 symbols for the time domain symbols (24 bits when QPSK is used). To be more specific, the user terminal multiplies the IFFT-applied symbol sequence by spreading codes (OCC: Orthogonal Cover Code) of the configured spreading factor (n). As a result, the same symbol sequence is mapped to n SC-FDMA symbols, and multiple user terminals are multiplexed by different OCCs. The user terminal multiplexes and transmits each block-spread symbol with reference signals (for example, DMRS).

Figure 9:
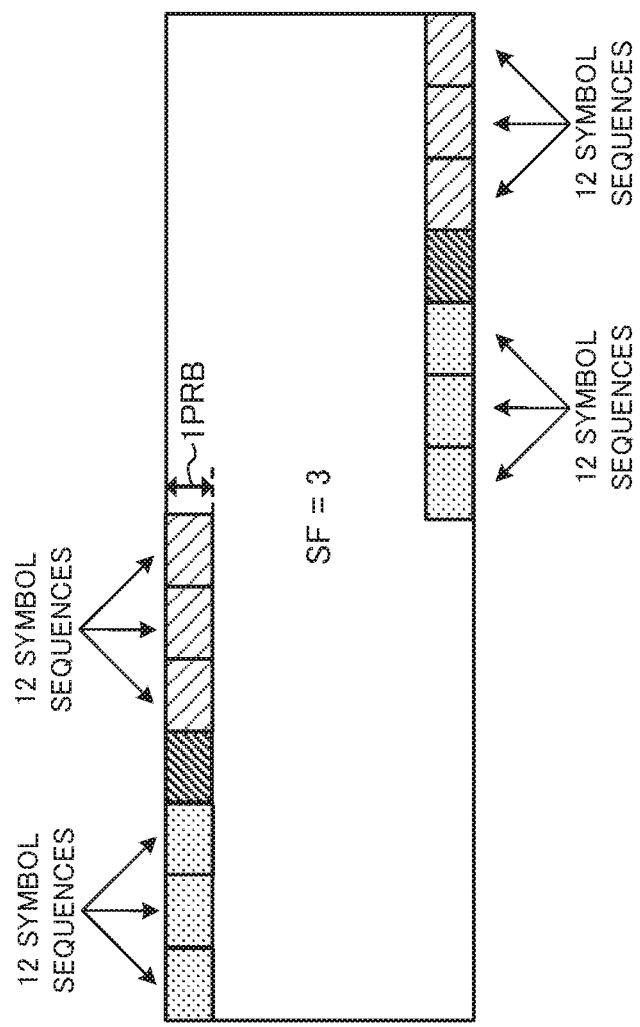
FIG. 9 is a diagram showing a setting example of a new PUCCH format according to the first example.

For example, if the spreading factor of the new PUCCH format is configured to 3 (n=3), as shown in FIG. 9, the same 12 symbol sequences (24 bits) are block-spread to three symbols, and therefore four types of 12 symbol sequences (24 bits) are mapped over the entire new PUCCH format. Also, since each user terminal is multiplied by a different OCC, as shown in FIG. 9, it is possible to code-division-multiplex three user terminals.

As described above, in the first example, the new PUCCH format with the spreading factor being configurable is used, so that PUCCH transmission can be performed by applying an optimal spreading factor depending on conditions (for example, the number of accommodated user terminals, the UCI payload size, etc.).

Second Example

In a second example, a radio communication method using a new PUCCH format in which the number of PRBs is configurable is described. Note that the second example may be used alone or in combination with the first example.

When the number of CCs that can be configured per user terminal is expanded to six or more (for example, 32), it is desirable to transmit HARQ-ACKs of at least 128 bits in the new PUCCH format. As described above, if the spreading factor is reduced, the number of bits that can be accommodated increases. However, if at least 128 bits are to be accommodated within one PRB, even if the spreading factor is set to 1, the coding rate must be increased.

For example, if the coding rate is 12/48, even if the spreading factor is 1, it is still not possible to accommodate at least 128 bits of HARQ-ACKs because the maximum number of UCI bits is 64 (see FIG. 7). Therefore, although it may be possible to increase the coding rate so as to accommodate at least 128 bits, increasing the coding rate increases the required SINR (Signal-to-Interference plus Noise power Ratio) and reduces the coverage.

Figure 10A:
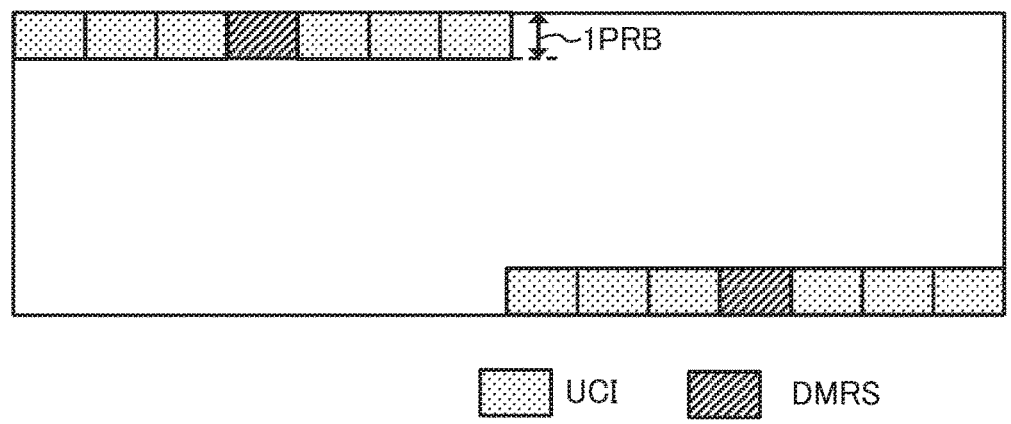
FIGS. 10A, 10B and 10C are diagrams showing a configuration example of a new PUCCH format according to the second example.
Figure 10B:
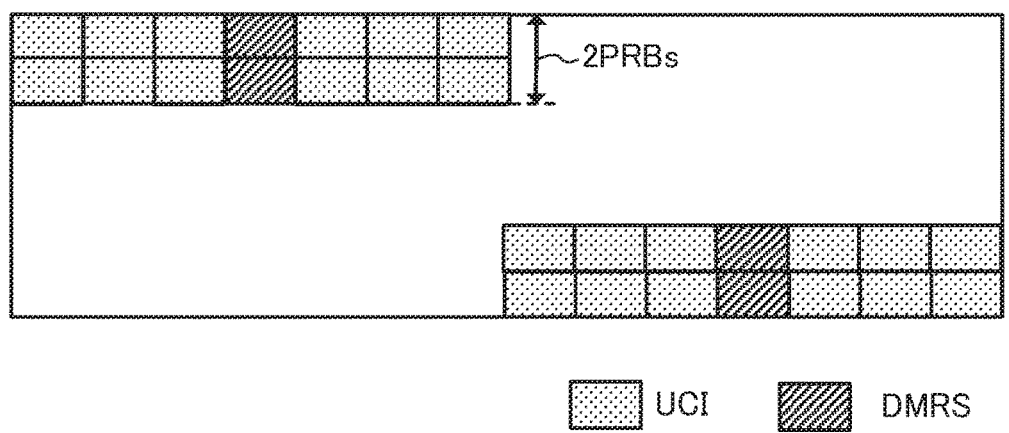
Figure 10C:
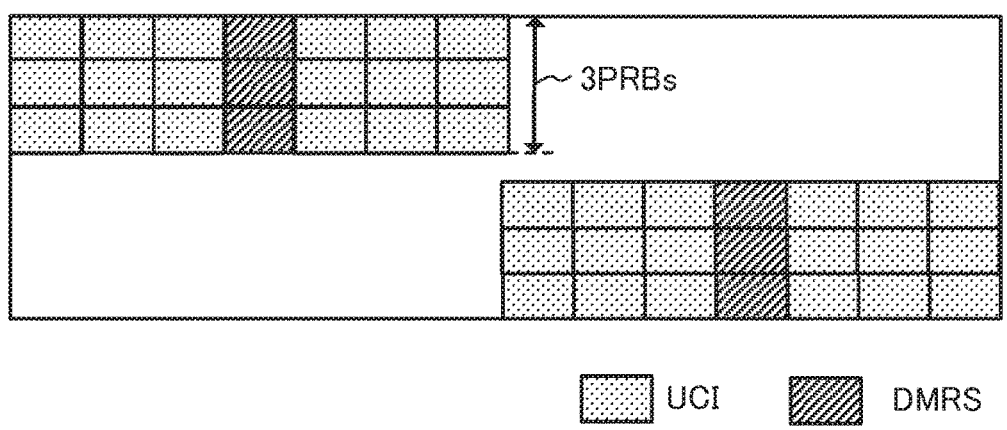

Therefore, it is desirable to increase the maximum number of UCI bits that can be accommodated in a new PUCCH format by using a new PUCCH format in which the number of PRBs is configurable. FIGS. 10A, 10B, and 10C are explanatory diagrams of an example of a new PUCCH format in which the number of PRBs is configurable. In FIGS. 10A, 10B, and 10C, an example in which one DMRS is provided per slot will be described, but the number and positions of DMRSs are not limited to those shown in FIGS. 10A, 10B, and 10C. Further, in FIGS. 10A, 10B, and 10C, the SRS may be arranged in the final symbol. In addition, in FIGS. 10A, 10B, and 10C, an example in which the spreading factor is 1 will be described, but the spreading factor is not limited to this. Also, in FIGS. 10A, 10B, and 10C, all the UCIs are indicated by the same hatching pattern, but this hatching pattern does not indicate that a single type of UCI is arranged.

As shown in FIG. 10A, when the spreading factor is 1 and the number of PRBs is 1, 12 types of coded bit sequences are mapped in the new PUCCH format (six types of coded bit sequences are mapped per slot). As shown in FIG. 10B, when the spreading factor is 1 and the number of PRBs is 2, 24 types of coded bit sequences are mapped (12 types of coded bit sequences are mapped per slot). Further, as shown in FIG. 10C, when the spreading factor is 1 and the number of PRBs is 3, 36 types of coded bit sequences are mapped (18 types of coded bit sequences are mapped per slot).

FIG. 11 is a diagram showing the relationship between the number of PRBs and the spreading factor used in the new PUCCH format, the payload of the new PUCCH format and the maximum number of UCI bits that can be accommodated in the new PUCCH format. In FIG. 11, it is assumed that one DMRS is allocated per slot (that is, it is assumed that coded bit sequences can be arranged in six symbols per slot), but this is not limiting. In addition, in FIG. 11, it is assumed that the coding rate is 12/48 and eight CRC bits are added, but the present invention is not limited to this.

As described above, when the spreading factor is 1 and the number of PRBs is 1, it is possible to accommodate 288 bits of coded bit sequences. On the other hand, if the spreading factor is 1 and the number of PRBs is 2, in the new PUCCH format, coded bit sequences of 12 symbols×12 types (six types per slot)×2 (PRB)×2 (QPSK)=576 bits can be accommodated. In this case, if the coding rate is 12/48 and eight CRC bits are added, the maximum number of UCI bits is 112 bits.

Also, when the spreading factor is 1 and the number of PRBs is 3, in the new PUCCH format, coded bit sequences of 12 symbols×12 types (six types per slot)×3 (PRB)×2 (QPSK)=864 bits can be accommodated. In this case, if the coding rate is 12/48 and eight CRC bits are added, the maximum number of UCI bits is 172 bits.

As described above, when the number of PRBs in the new PUCCH format is increased, the payload increases while overhead increases. Therefore, the radio base station designates the number of PRBs depending on conditions (for example, the number of accommodated user terminals, the number of UCI bits, etc.), and transmits information indicating this number of PRBs to the user terminal. When CA to use new PUCCH format is configured (that is, when CA in which six or more CCs can be configured is used), the user terminal configures the number of PRBs specified via higher layer signaling or physical layer signaling from the radio base station as the number of PRBs in the new PUCCH format.

Note that higher layer signaling is, for example, RRC signaling. Also, physical layer signaling is, for example, information included in DCI that is transmitted by the downlink control channel (PDCCH or EPDCCH).

Alternatively, when CA to use a new PUCCH format (that is, CA in which six or more CCs can be configured) is configured, the user terminal may determine (select) the number of PRBs to use in the new PUCCH format based on the number of UCI bits and configure the number of PRBs. For example, the user terminal may determine the number of PRBs in the new PUCCH format based on the number of UCI bits transmitted on the PUCCH and the maximum number of UCI bits according to the number of PRBs (see FIG. 11).

<Signal Generation Processing>

Signal generation processing in the new PUCCH format in which the number of PRBs is configured as described above will be described below mainly focusing on differences from the first example. In the following, it is assumed that data symbol modulation is performed using QPSK, but the modulation method is not limited to QPSK. In the following description, it is assumed that the spreading factor is 1, but the spreading factor is not limited to 1 (SF).

In rate matching, the user terminal punctures at least part of the coded bit sequence if it exceeds the payload of the number of PRBs configured in the new PUCCH format. On the other hand, if the number of coded bits is less than the payload, the user terminal repeats at least a part of the coded bit sequences until the number of coded bits reaches the payload (repetition).

For example, if the number of PRBs in the new PUCCH format is configured to 2, when the number of coded bits exceeds 576 bits, the user terminal punctures a portion of the coded bit sequences (for example, excess bits) (see FIG. 11). On the other hand, if the number of coded bits is less than 576 bits, the user terminal repeats the coded bit sequences until the number of coded bits becomes 576 bits.

The user terminal maps the coded bit sequence to modulation symbols (SC-FDMA symbol) and applies the DFT to the modulation symbols. The user terminal converts the frequency domain signal after the DFT into a time domain symbol by the IFFT.

Assuming that the number of PRBs constituting the new PUCCH format is m, for the symbol after IFFT, the user terminal performs block spreading every 12×m symbols (12×m×2 bits in case of QPSK). To be more specific, the user terminal multiplies the IFFT-applied symbol sequence by spreading codes (OCC) of the configured spreading factor (n). As a result, the same symbol sequence is mapped to n SC-FDMA symbols, and multiple user terminals are multiplexed by different OCCs. The user terminal multiplexes and transmits each block-spread symbol with reference signals (for example, DMRS).

<Mapping Processing>

Figure 12A:
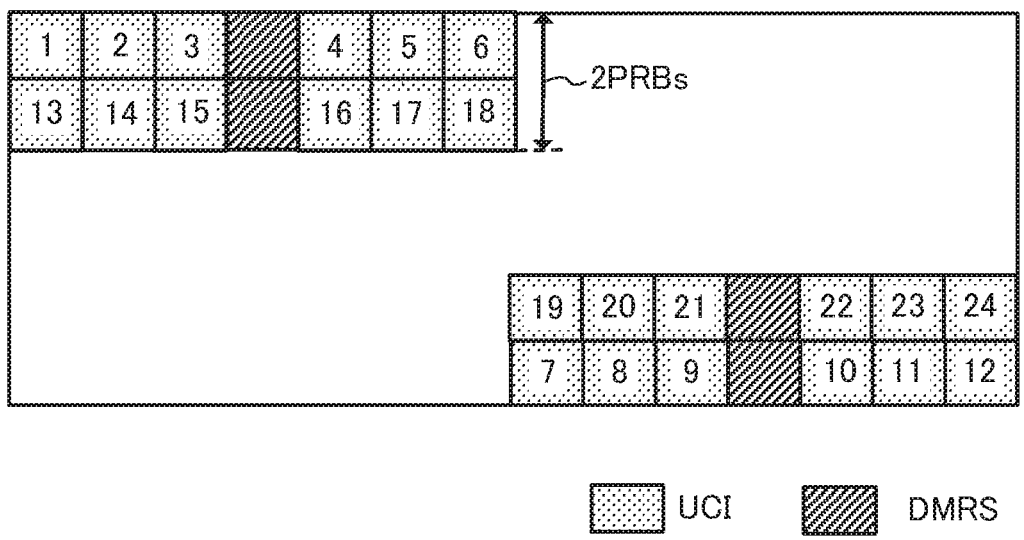
FIGS. 12A and 12B are diagrams showing examples of mapping according to the second example.
Figure 12B:
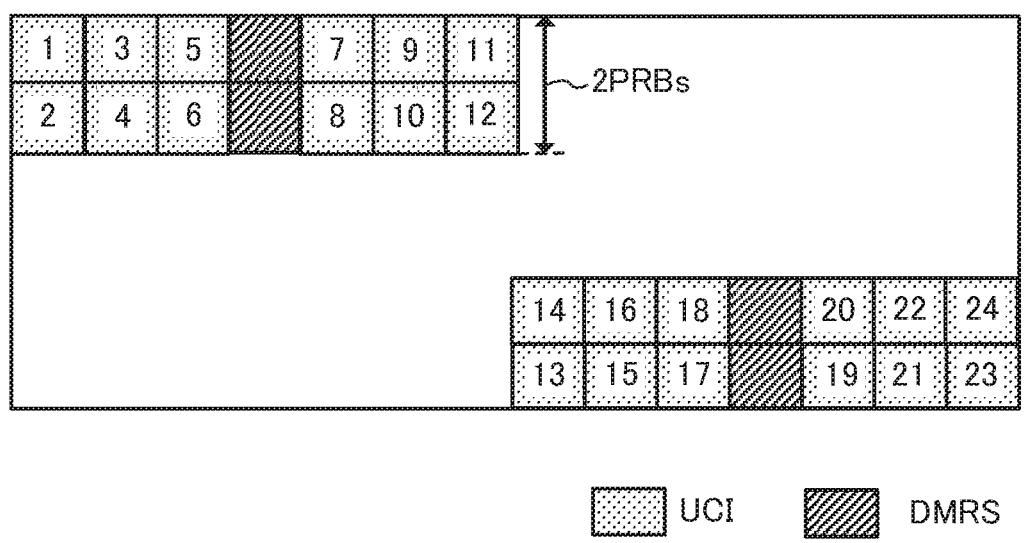

Next, the mapping process for the SC-FDMA symbols of each PRB of the symbol sequence generated as described above will be described in detail. FIGS. 12A and 12B are diagrams showing an example of symbol sequence mapping.

As shown in FIG. 12A, in a predetermined number of PRBs configured, the user terminal may sequentially map (interleave) the symbol sequence along the time direction (SC-FDMA symbol). That is, within the same resource block, the user terminal may map (interleave) the symbol sequence along the time direction in order from the earliest SC-FDMA symbol. In this case, frequency hopping can be applied to the symbol sequence (bit sequence) more frequently (in the example of FIG. 12A, frequency hopping can be applied twice over the entire sequence), so that a high frequency diversity effect can be obtained and a performance improvement effect can be expected.

Alternatively, as shown in FIG. 12B, the user terminal may map (interleave) symbol sequences to SC-FDMA symbols in a predetermined number of PRBs configured in order from the first SC-FDMA symbol of the subframe (that is, in order in the frequency (PRB) direction). That is, the user terminal may map (interleave) the symbol sequences along the frequency direction (PRB direction) in order from the first SC-FDMA symbol of the subframe. In this case, mapping is completed in SC-FDMA symbol units, so that it is possible to perform the processing (for example, DFT preceding) required after mapping (interleaving) and mapping (interleaving) in parallel, simultaneously, so that the processing delay in transmission points (user terminals) can be improved.

As described above, in the second example, a new PUCCH format in which the number of PRBs is configurable is used, so that the PUCCH can be transmitted by using an optimal number of PRBs depending on conditions (for example, the number of accommodated user terminals, the payload size of UCI, etc.).

(Radio Communication System)

Now, the structure of the radio communication system according to one or more embodiments of the present invention will be described below. In this radio communication system, the radio communication methods according to each embodiment of the present invention are employed. Note that the radio communication methods of the above-described embodiment may be applied individually or may be applied in combination.

Figure 13:
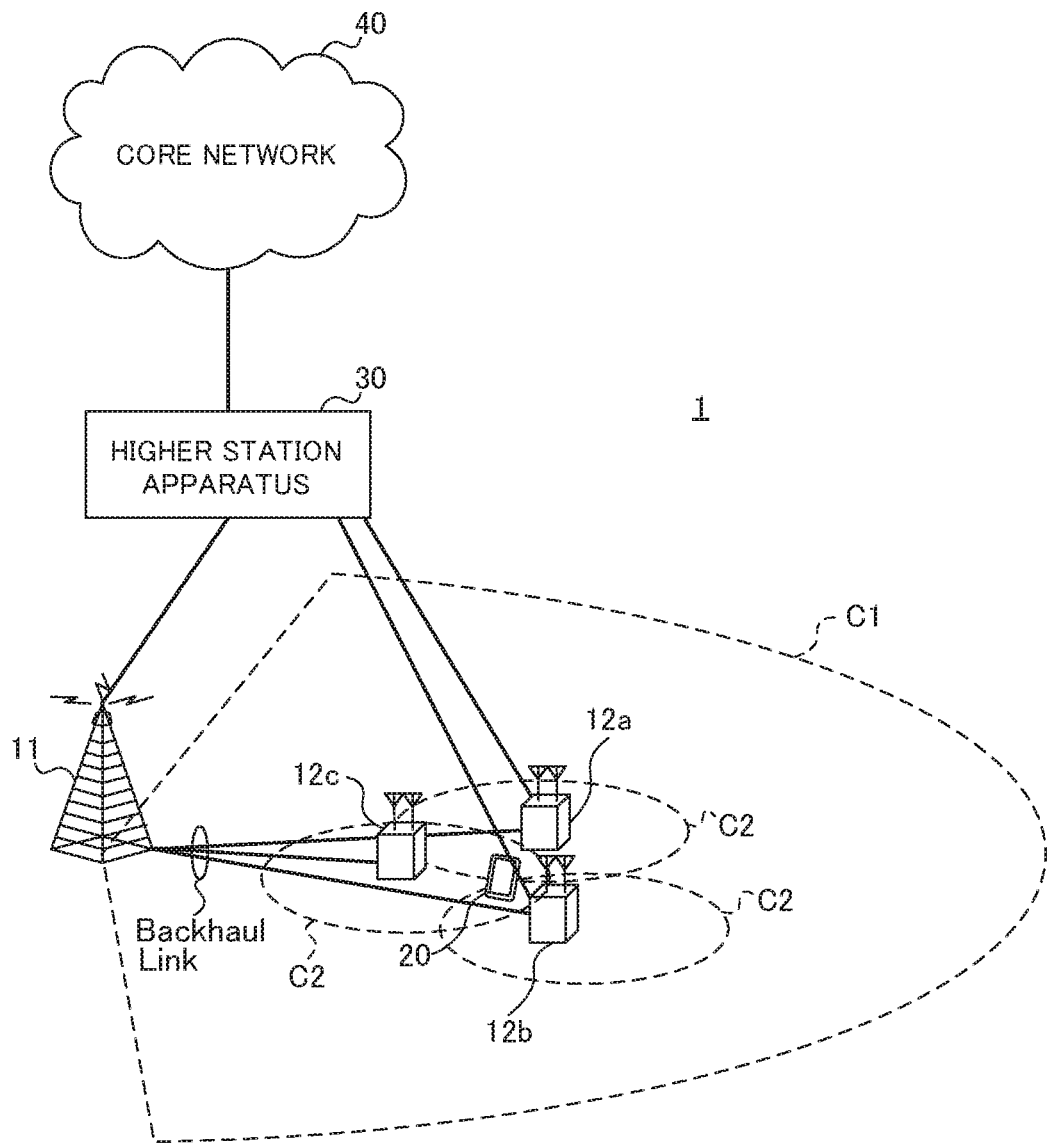
FIG. 13 is a diagram to show an example of a schematic structure of a radio communication system according to one or more embodiments of the present invention.

FIG. 13 is a diagram to show an example of a schematic structure of a radio communication system according to one or more embodiments of the present invention. The radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit. Note that the radio communication system 1 may be referred to as "SUPER 3G," "LTE-A"

(LTE-Advanced), "IMT-Advanced," "4G," "5G," "FRA" (Future Radio Access) and so on.

The radio communication system 1 shown in FIG. 13 includes a radio base station 11 that forms a macro cell C1, and radio base stations 12a to 12c that form small cells C2, which are placed within the macro cell C1 and which are narrower than the macro cell C1. Also, user terminals 20 are placed in the macro cell C1 and in each small cell C2.

The user terminals 20 can connect with both the radio base station 11 and the radio base stations 12. The user terminals 20 may use the macro cell C1 and the small cells C2, which use different frequencies, at the same time, by means of CA or DC. Also, the user terminals 20 can execute CA or DC by using a plurality of cells (CCs) (for example, six or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the configuration of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with a higher station apparatus 30, and are connected with a core network 40 via the higher station apparatus 30. Note that the higher station apparatus 30 may be, for example, an access gateway apparatus, a radio network controller (RNC), a mobility management entity (MME) and so on, but is by no means limited to these. Also, each radio base station 12 may be connected with higher station apparatus 30 via the radio base station 11.

Note that the radio base station 11 is a radio base station having a relatively wide coverage, and may be referred to as a "macro base station," a "central node," an "eNB" (eNodeB), a "transmitting/receiving point" and so on. Also, the radio base stations 12 are radio base stations having local coverages, and may be referred to as "small base stations," "micro base stations," "pico base stations," "femto base stations," "HeNBs" (Home eNodeBs), "RRHs" (Remote Radio Heads), "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals or stationary communication terminals.

In the radio communication system 1, as radio access schemes, OFDMA (Orthogonal Frequency Division Multiple Access) is applied to the downlink, and SC-FDMA (Single-Carrier Frequency Division Multiple Access) is applied to the uplink. OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth (CCs) into bands formed with one or continuous resource blocks per terminal, and allowing a plurality of terminals to use mutually different bands. Incidentally, the uplink and downlink radio access schemes are not limited to these combinations, and OFDMA may be applied in the uplink.

In the radio communication system 1, a downlink shared channel (PDSCH: Physical Downlink Shared CHannel), which is used by each user terminal 20 on a shared basis, a broadcast channel (PBCH: Physical Broadcast CHannel), downlink L1/L2 control channels and so on are used as downlink channels. User data, higher layer control information and predetermined SIBs (System Information Blocks) are communicated in the PDSCH. Also, the MIB (Master Information Blocks) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI) including PDSCH and PUSCH scheduling information is communicated by the PDCCH. The number of OFDM symbols to use for the PDCCH is communicated by the PCFICH. HARQ delivery acknowledgement signals (ACKs/NACKs) in response to the PUSCH are communicated by the PHICH. The EPDCCH is frequency-division-multiplexed with the PDSCH (downlink shared data channel) and used to communicate DCI and so on, like the PDCCH.

In the radio communication system 1, an uplink shared channel (PUSCH: Physical Uplink Shared CHannel), which is used by each user terminal 20 on a shared basis, an uplink control channel (PUCCH: Physical Uplink Control CHannel), a random access channel (PRACH: Physical Random Access CHannel) and so on are used as uplink channels. User data and higher layer control information are communicated by the PUSCH. Uplink control information (UCI: Uplink Control Information) including at least one of delivery acknowledgment information (ACK/NACK) and radio quality information (CQI), is communicated by the PUSCH or the PUCCH. By means of the PRACH, random access preambles for establishing connections with cells are communicated.

<Radio Base Station>

Figure 14:
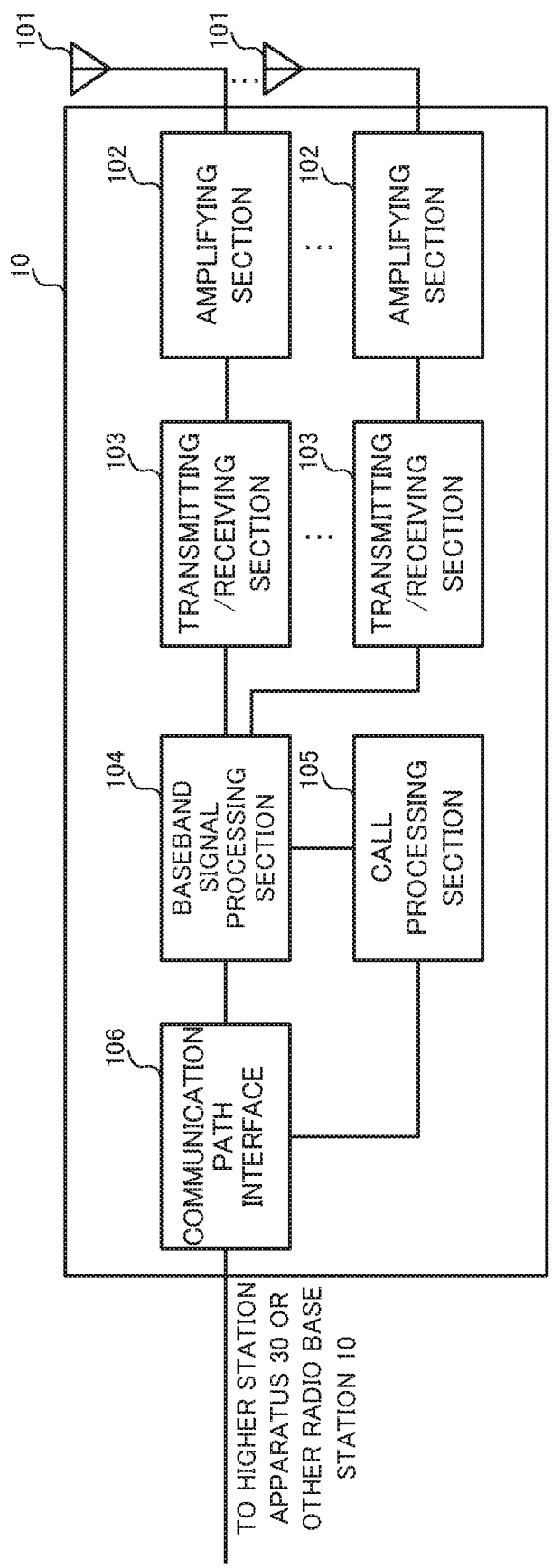
FIG. 14 is a diagram to show an example of an overall structure of a radio base station according to one or more embodiments of the present invention.

FIG. 14 is a diagram to show an example of an overall structure of a radio base station according to one or more embodiments of the present invention. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are pre-coded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101.

The transmitting/receiving sections 103 can be constituted by transmitters/receivers, transmitting/receiving circuits or transmitting/receiving devices that can be described based on common understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base station 10 and manages the radio resources.

The communication path interface section 106 transmits and receives signals to and from the higher station apparatus 30 via a predetermined interface. Also, the communication path interface 106 may transmit and/or receive signals (backhaul signaling) with other radio base stations 10 via an inter-base station interface (for example, an interface in compliance with the CPRI (Common Public Radio Interface), such as optical fiber, the X2 interface, etc.).

Figure 15:
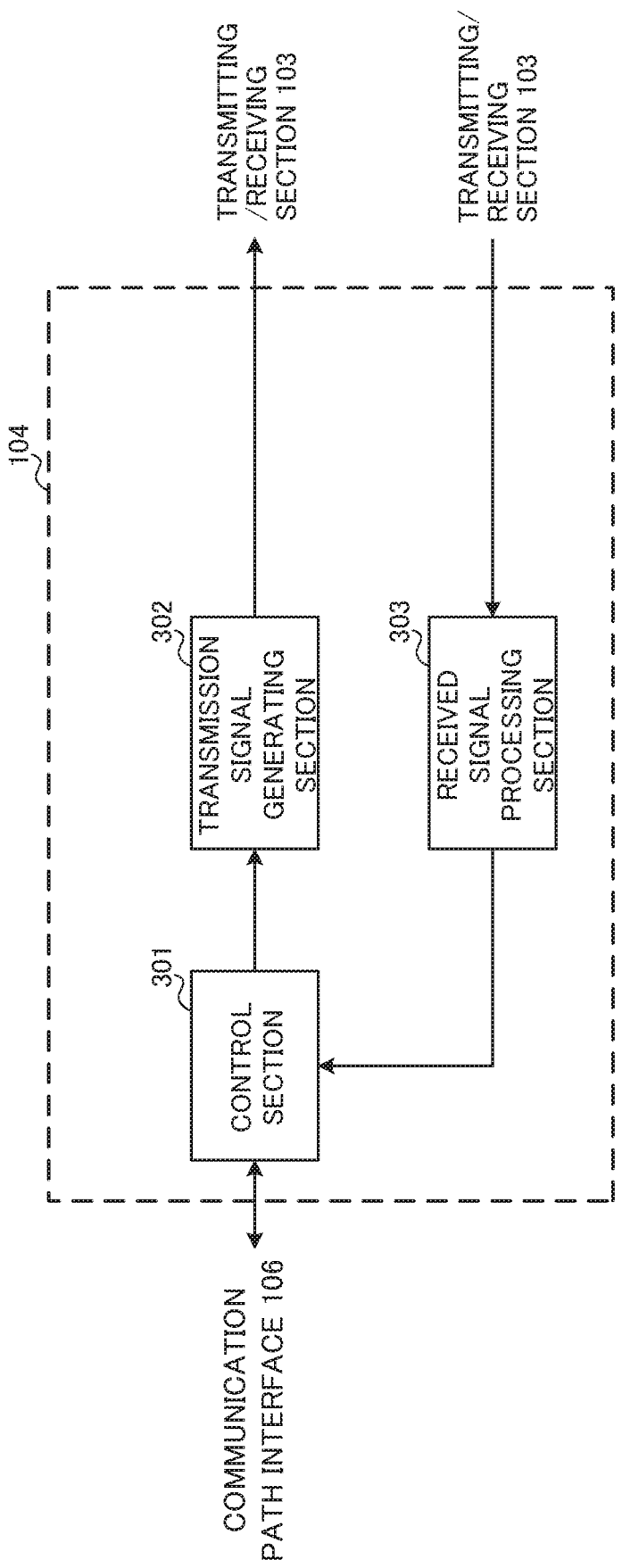
FIG. 15 is a diagram to show an example of a functional structure of a radio base station according to one or more embodiments of the present invention.

FIG. 15 is a diagram to show an example of a functional structure of a radio base station according to one or more embodiments of the present invention. Note that, although FIG. 15 primarily shows functional blocks that pertain to characteristic parts of the embodiments of the present invention, the radio base station 10 has other functional blocks that are necessary for radio communication as well. As shown in FIG. 15, the baseband signal processing section 104 has a control section 301, a transmission signal generating section 302 and a received signal processing section 303.

The control section 301 controls the entire radio base station 10. The control section 301 controls, for example, generation of a downlink signal by the transmission signal generation section 302 and reception processing of a signal by the received signal processing section 303.

To be more specific, the control section 301 controls the transmission of downlink user data (for example, controls the modulation scheme, the coding rate, the allocation of resources (scheduling), etc.) based on channel state information (P-CSI) that is periodically reported from the user terminals 20.

Furthermore, the control section 301 controls the mapping of downlink control information (DCI), including information (DL/UL grant) for allocating resources to downlink/uplink user data and so on to a downlink control channel (PDCCH and/or EPDCCH). Also, the control section 301 controls the scheduling of downlink reference signals such as the CRS (Cell-specific Reference Signal), the CSI-RS (Channel State Information Reference Signal) and so on.

Furthermore, the control section 301 controls the carrier aggregation (CA) of the user terminal 20. To be more specific, the control section 301 may control the transmission signal generation section 302 to determine application of CA/changes in the number of CCs and so on, based on CSI or the like reported from the user terminals 20, and generate information to indicate such application/changes. Note that the information to indicate the application/changes may be included in control information sent by higher layer signaling.

Further, the control section 301 controls the spreading factor/the number of PRBs to use in the new PUCCH format. To be more specific, the control section 301 may control the transmission signal generation section 302 to determine the number of spreading factors and/or the number of PRBs depending on conditions (for example, the number of accommodated user terminals, the payload size of UCI, etc.), and generate information indicating the spreading factor/the number of PRBs.

When CA to use a new PUCCH format is configured (that is, when CA in which six or more CCs can be configured is used), information indicating the spreading factor and/or the number of PRBs may be transmitted to the user terminal 20 by higher layer signaling or may be included in DCI transmitted on the downlink control channel (PDCCH or EPDCCH).

The control section 301 can be constituted by a controller, a control circuit or a control device that can be described based on common understanding of the technical field to which the present invention pertains.

The transmission signal generation section 302 performs generation processing (for example, addition of CRC bits, coding, modulation, mapping, IFFT, multiplication of spreading code, etc.) of downlink signals (including a downlink data signal and a downlink control signal) based on commands from the control section 301.

To be more specific, the transmission signal generation section 302 generates the downlink data signal (PDSCH) including the notification information (control information) based on higher layer signaling and the user data, and outputs the generated downlink data signal (PDSCH) to the transmitting/receiving section 103. Further, the transmission signal generation section 302 generates a downlink control signal (PDCCH) including the DCI and outputs the generated control signal to the transmitting/receiving section 103. Furthermore, the transmission signal generation section 302 generates a downlink reference signal such as the CRS, the CSI-RS and so on, and outputs these signals to transmitting/receiving sections 103.

For the transmission signal generation section 302, a signal generator, a signal generating circuit or a signal generating device that can be described based on common understanding of the technical field to which the present invention pertains can be used.

The received signal processing section 303 performs receiving processes (for example, demapping, demodulation, decoding and so on) of received signals that are input from the user terminals. The processing results are output to the control section 301.

To be more specific, the received signal processing section 303 detects the PUCCH format and performs the receiving process of UCI (at least one of HARQ-ACK, CQI, and SR). Further, the received signal processing section 303 detects the spreading factor/the number of PRBs configured in the new PUCCH format, and performs UCI reception processing. Note that the spreading factor and/or the number of PRBs may be specified from the control section 301 or may be reported from the user terminal 20.

The receiving process section 303 can be constituted by a signal processor, a signal processing circuit or a signal processing device, and a measurer, a measurement circuit or a measurement device that can be described based on common understanding of the technical field to which the present invention pertains.

<User Terminal>

Figure 16:
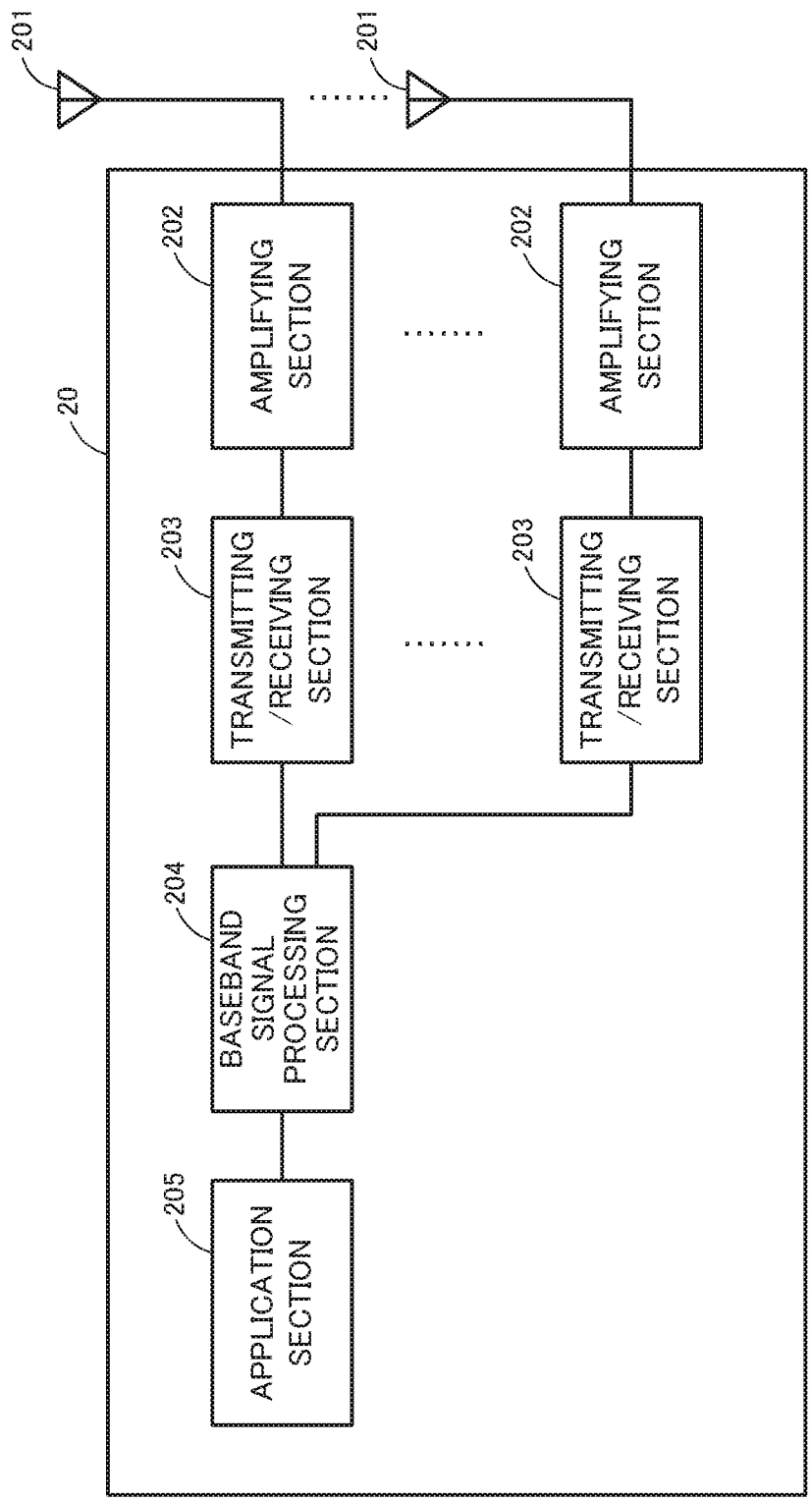
FIG. 16 is a diagram to show an example of an overall structure of a user terminal according to one or more embodiments of the present invention.

FIG. 16 is a diagram to show an example of an overall structure of a user terminal according to one or more embodiments of the present invention. A user terminal 20 has a plurality of transmitting/receiving antennas 201 for MIMO communication, amplifying sections 202, transmitting/receiving sections 203, a baseband signal processing section 204 and an application section 205.

Radio frequency signals that are received in a plurality of transmitting/receiving antennas 201 are each amplified in the amplifying sections 202. Each transmitting/receiving section 203 receives the downlink signals amplified in the amplifying sections 202. The received signal is subjected to frequency conversion and converted into the baseband signal in the transmitting/receiving sections 203, and output to the baseband signal processing section 204.

In the baseband signal processing section 204, the baseband signal that is input is subjected to an FFT process, error correction decoding, a retransmission control receiving process, and so on. Downlink user data is forwarded to the application section 205. The application section 205 performs processes related to higher layers above the physical layer and the MAC layer, and so on. Furthermore, in the downlink data, broadcast information is also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, pre-coding, a discrete Fourier transform (DFT) process, an IFFT process and so on, and the result is forwarded to each transmitting/receiving section 203. The baseband signal that is output from the baseband signal processing section 204 is converted into a radio frequency bandwidth in the transmitting/receiving sections 203. The radio frequency signals that are subjected to frequency conversion in the transmitting/receiving sections 203 are amplified in the amplifying sections 202, and transmitted from the transmitting/receiving antennas 201.

For the transmitting/receiving sections 203, transmitters/receivers, transmitting/receiving circuits or transmitting/receiving devices that can be described based on common understanding of the technical field to which the present invention pertains can be used. Furthermore, a transmitting/receiving section 203 may be structured as one transmitting/receiving section, or may be formed with a transmission section and a receiving section.

Figure 17:
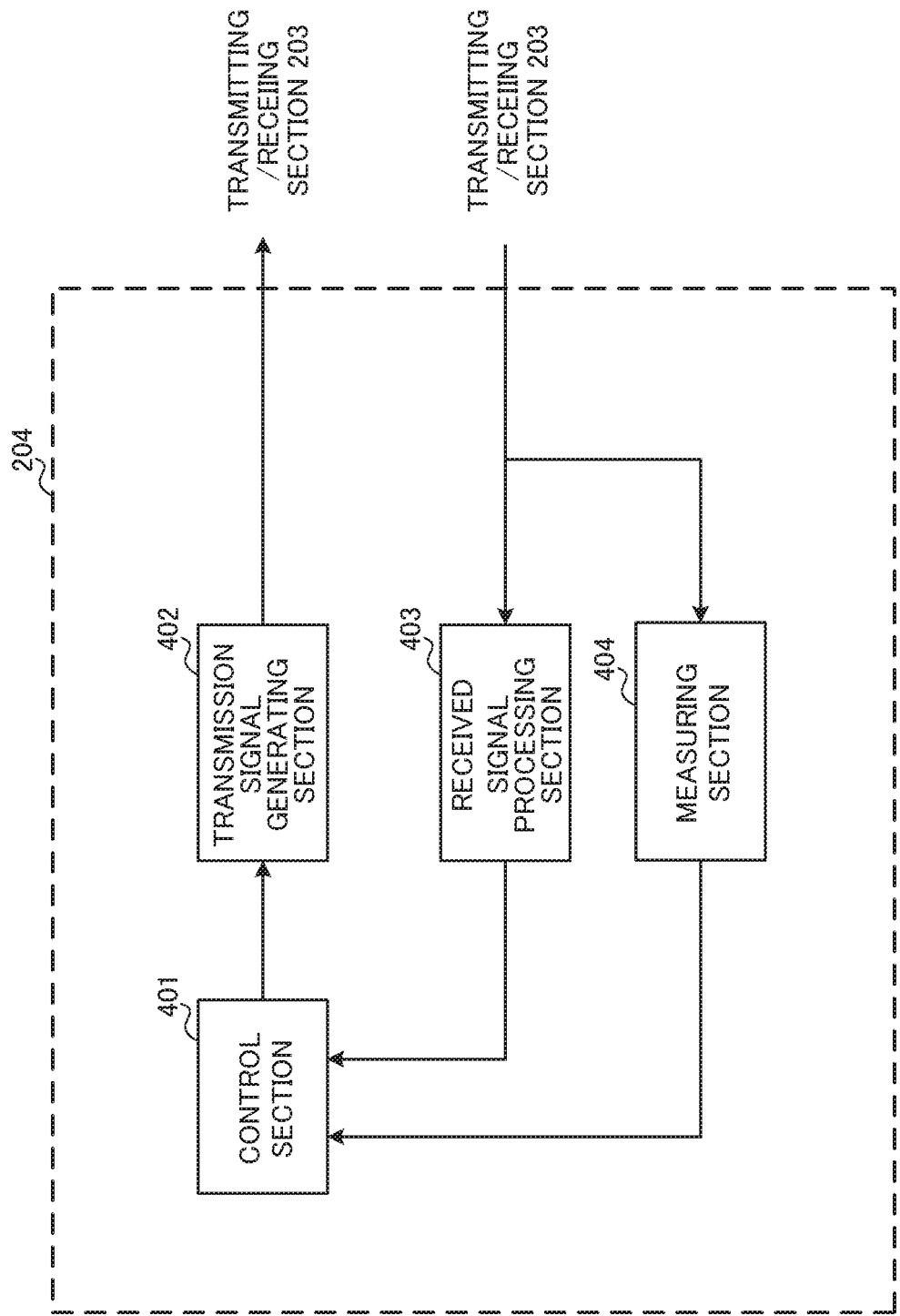
FIG. 17 is a diagram to show an example of a functional structure of a user terminal according to one or more embodiments of the present invention.

FIG. 17 is a diagram to show an example of a functional structure of a user terminal according to one or more embodiments of the present invention. Note that, although FIG. 17 primarily shows functional blocks that pertain to characteristic parts of the embodiments of the present invention, the user terminal 20 has other functional blocks that are necessary for radio communication as well. As shown in FIG. 14, the baseband signal processing section 204 provided in the user terminal 20 has a control section 401, a transmission signal generation section 402, a received signal processing section 403 and a measurement section 404.

The control section 401 controls the whole of the user terminal 20. The control section 401 controls generation of a signal by the transmission signal generation section 402 and reception processing of a signal by the received signal processing section 403, for example.

To be more specific, the control section 401 controls the PUCCH format to be applied for transmission of UCI (at least one of HARQ-ACK, CQI, and SR). To be more specific, the control section 401 may determine whether to apply a new PUCCH format or apply an existing PUCCH format according to the number of CCs configured in the user terminal 20 or the number of CCs scheduled for the user terminal 20. Further, when a plurality of new PUCCH formats are provided, the control section 401 may determine the new PUCCH format to apply according to the payload of UCI.

Also, the control section 401 configures the spreading factor/the number of PRBs to use in the new PUCCH format. For example, if CA to integrate six or more CCs is configured, the control section 401 may configure the spreading factor and/or the number of resource blocks, specified from the radio base station 10 via higher layer signaling or physical layer signaling, in the new PUCCH format. Alternatively, if CA to integrate six or more CCs is configured, the control section 401 may configure the spreading factor and/or the number of resource blocks to use in the new PUCCH format based on the number of UCI bits.

Further, the control section 401 controls carrier aggregation (CA). To be more specific, the control section 401 performs CA based on information indicating the application/change of CA reported from the radio base station 10.

For the control section 401, a controller, a control circuit or a control device that can be described based on common understanding of the technical field to which the present invention pertains can be used.

The transmission signal generation section 402 generates uplink signals (including an uplink data signals and an uplink control signals) based on commands from the control section 401, and outputs the uplink signals to the transmitting/receiving section 203. For example, the transmission signal generation section 402 generates uplink control signals (PUCCH) including UCI (at least one of HARQ-ACK, CQI, and SR).

When the number of bits of coded UCI bit sequences exceeds the payload calculated based on the spreading factor/the number of PRBs configured by the control section 401 (see FIGS. 7 and 11), the transmission signal generation section 402 punctures at least a part of the coded bit sequences, and, if the number of bits of the coded UCI bit sequence is less than the payload, the transmission signal generation section 402 may repeat at least a part of the coded bit sequences (FIG. 8).

In addition, the transmission signal generation section 402 generates a symbol sequence obtained by performing DFT and IFFT on the SC-FDMA symbol (modulation symbol) to which the UCI coded bit sequence is mapped, with a spreading code of the spreading factor configured by the control section 401 (FIG. 8).

In addition, the transmission signal generation section 402 maps the coded bit sequence of UCI to SC-FDMA symbols of PRB of the number of PRBs configured by the control section 401. To be more specific, within the predetermined number of PRBs that have been configured, the transmission signal generation section 402 may map (interleave) the coded bit sequence in order from the preceding SC-FDMA symbol in the time direction of the same resource block (FIG. 12A). Alternatively, the transmission signal generation section 402 may map (interleave) the coded bit sequence in order from the PRB direction (frequency direction) of the number of PRBs that have been configured for the SC-FDMA symbol at the head of the subframe (FIG. 12B).

For the transmission signal generation section 402, a signal generator, a signal generating circuit or a signal generating device that can be described based on common understanding of the technical field to which the present invention pertains can be used.

The received signal processing section 403 performs the receiving process (for example, demapping, demodulation, decoding, etc.) on downlink signals (including downlink control signals and downlink data signals). The received signal processing section 403 outputs the information received from the radio base station 10, to the control section 401. The received signal processing section 403 outputs, for example, broadcast information, system information, control information by higher layer signaling such as RRC signaling, DCI, and the like, to the control section 401.

The received signal processing section 403 can be constituted by a signal processor, a signal processing circuit or a signal processing device that can be described based on common understanding of the technical field to which the present invention pertains. Also, the received signal processing section 403 can constitute the receiving section according to one or more embodiments of the present invention.

The measurement section 404 measures channel states based on reference signals (for example, CSI-RS) from the radio base station 10, and outputs the measurement results to the control section 401. Measurement of the channel state may be performed for each CC.

The measurement section 404 can be constituted by a signal processor, a signal processing circuit or a signal processing device, and a measurer, a measurement circuit or a measurement device that can be described based on common understanding of the technical field to which the present invention pertains.

Note that the block diagrams that have been used to describe the above embodiments show blocks in functional units. These functional blocks (components) may be implemented in arbitrary combinations of hardware and software. Also, the means for implementing each functional block is not particularly limited. That is, each functional block may be implemented with one physically-integrated device, or may be implemented by connecting two physically-separate devices via radio or wire and using these multiple devices.

For example, part or all of the functions of the radio base station 10 and the user terminal 20 may be implemented by using hardware such as an ASIC (Application-Specific Integrated Circuit), a PLD (Programmable Logic Device), an FPGA (Field Programmable Gate Array) and so on. Also, the radio base stations 10 and user terminals 20 may be implemented with a computer device that includes a processor (CPU), a communication interface for connecting with networks, a memory and a computer-readable storage medium that holds programs. That is, the radio base stations and user terminals according to one or more embodiments of the present invention may function as computers that execute the processes of the radio communication method of the embodiments of the present invention.

Here, the processor and the memory are connected with a bus for communicating information. Also, the computer-readable recording medium is a storage medium such as, for example, a flexible disk, an opto-magnetic disk, a ROM (Read Only Memory), an EPROM (Erasable Programmable ROM), a CD-ROM (Compact Disc-ROM), a RAM (Random Access Memory), a hard disk and so on. Also, the programs may be transmitted from the network through, for example, electric communication channels. Also, the radio base stations 10 and user terminals 20 may include input devices such as input keys and output devices such as displays.

The functional structures of the radio base stations 10 and user terminals 20 may be implemented with the above-described hardware, may be implemented with software modules that are executed on the processor, or may be implemented with combinations of both. The processor controls the whole of the user terminals 20 by running an operating system. Also, the processor reads programs, software modules and data from the storage medium into the memory, and executes various types of processes.

Here, these programs have only to be programs that make a computer execute each operation that has been described with the above embodiments. For example, the control section 401 of the user terminals 20 may be stored in the memory and implemented by a control program that operates on the processor, and other functional blocks may be implemented likewise.

Also, software and commands may be transmitted and received via communication media. For example, when software is transmitted from a website, a server or other remote sources by using wired technologies such as coaxial cables, optical fiber cables, twisted-pair cables and digital subscriber lines (DSL) and/or wireless technologies such as infrared radiation, radio and microwaves, these wired technologies and/or wireless technologies are also included in the definition of communication media.

Note that the terminology used in this description and the terminology that is needed to understand this description may be replaced by other terms that convey the same or similar meanings. For example, "channels" and/or "symbols" may be replaced by "signals" (or "signaling"). Also, "signals" may be "messages." Furthermore, "component carriers" (CCs) may be referred to as "carrier frequencies," "cells" and so on.

Also, the information and parameters described in this description may be represented in absolute values or in relative values with respect to a predetermined value, or may be represented in other information formats. For example, radio resources may be specified by indices.

The information, signals and/or others described in this description may be represented by using a variety of different technologies. For example, data, instructions, commands, information, signals, bits, symbols and chips, all of which may be referenced throughout the description, may be represented by voltages, currents, electromagnetic waves, magnetic fields or particles, optical fields or photons, or any combination of these.

The example s/embodiments illustrated in this description may be used individually or in combinations, and the mode of may be switched depending on the implementation. Also, a report of predetermined information (for example, a report to the effect that "X holds") does not necessarily have to be sent explicitly, and can be sent implicitly (by, for example, not reporting this piece of information).

Reporting of information is by no means limited to the example s/embodiments described in this description, and other methods may be used as well. For example, reporting of information may be implemented by using physical layer signaling (for example, DCI (Downlink Control Information) and UCI (Uplink Control Information)), higher layer signaling (for example, RRC (Radio Resource Control) signaling, MAC (Medium Access Control) signaling, and broadcast information (the MIB (Master Information Block) and SIBs (System Information Blocks))), other signals or combinations of these. Also, RRC signaling may be referred to as "RRC messages," and can be, for example, an RRC connection setup message, RRC connection reconfiguration message, and so on.

The examples/embodiments illustrated in this description may be applied to LTE (Long Term Evolution), LTE-A (LTE-Advanced), SUPER 3G, IMT-Advanced, 4G, 5G, FRA (Future Radio Access), CDMA 2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), and other adequate systems, and/or next-generation systems that are enhanced based on these.

The order of processes, sequences, flowcharts and so on that have been used to describe the examples/embodiments herein may be re-ordered as long as inconsistencies do not arise. For example, although various methods have been illustrated in this description with various components of steps in exemplary orders, the specific orders that illustrated herein are by no means limiting.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining example s, and should by no means be construed to limit the present invention in any way.

What is claimed is:

1. A terminal comprising:
a transmitter that transmits uplink control information (UCI) using an uplink control channel; and
a processor that controls at least one of generation and transmission of the UCI based on a spreading factor of the uplink control channel,
wherein at least one of a number of symbols and a position of a demodulation reference signal (DMRS) for the uplink control channel is fixed for at least two spreading factors, and
wherein the processor determines a number of bits to transmit on the uplink control channel based on a modulation scheme and a number of symbols excluding the DMRS.

2. The terminal according to claim 1, further comprising a receiver that receives information indicative of the spreading factor via higher layer signaling.

3. The terminal according to claim 1, wherein the spreading factor is 1, 2, or 3.

4. The terminal according to claim 2, wherein the spreading factor is 1, 2, or 3.

5. The terminal according to claim 1, wherein the processor further determines the number of bits to transmit on the uplink control channel, based on at least one of the spreading factor and a number of resource blocks used for the uplink control channel controlled based on information indicative of the spreading factor.

6. The terminal according to claim 2, wherein the processor further determines the number of bits to transmit on the uplink control channel, based on at least one of the spreading factor and a number of resource blocks used for the uplink control channel controlled based on information indicative of the spreading factor.

7. The terminal according to claim 3, wherein the processor further determines the number of bits to transmit on the uplink control channel, based on at least one of the spreading and a number of resource blocks used for the uplink control channel controlled based on information indicative of the spreading factor.

8. The terminal according to claim 1, wherein the processor maps the UCI over a plurality of the resource blocks per symbol in order from a first symbol of a subframe using the uplink control channel.

9. The terminal according to claim 2, wherein the processor maps the UCI over a plurality of the resource blocks per symbol in order from a first symbol of a subframe using the uplink control channel.

10. The terminal according to claim 3, wherein the processor maps the UCI over a plurality of the resource blocks per symbol in order from a first symbol of a subframe using the uplink control channel.

11. A radio communication method for a terminal, comprising:
transmitting uplink control information (UCI) using an uplink control channel; and
controlling at least one of generation and transmission of the UCI based on a spreading factor of the uplink control channel,
wherein at least one of a number of symbols and a position of a demodulation reference signal (DMRS) for the uplink control channel is fixed for at least two spreading factors, and
wherein the terminal further determines a number of bits to transmit on the uplink control channel based on a modulation scheme and a number of symbols excluding the DMRS.

* * * * *